(12) United States Patent
Watson et al.

(10) Patent No.: US 6,631,779 B2
(45) Date of Patent: Oct. 14, 2003

(54) ON DEMAND VEHICLE DRIVE SYSTEM

(75) Inventors: Will Watson, Southfield, MI (US); Alan L. Miller, Ithaca, NY (US); Drew A. Sundquist, Canton, MI (US); Roger T. Simpson, Ithaca, NY (US); Diane K. Ducklow, Farmington, MI (US); Joseph W. Beckerman, Livonia, MI (US); Dan J. Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 09/788,832

(22) Filed: Feb. 20, 2001

(65) Prior Publication Data

US 2001/0042652 A1 Nov. 22, 2001

Related U.S. Application Data

(62) Division of application No. 09/327,140, filed on Jun. 7, 1999, now Pat. No. 6,263,995, which is a division of application No. 08/998,265, filed on Dec. 24, 1997, now Pat. No. 6,062,330, which is a division of application No. 08/814,189, filed on Mar. 10, 1997, now Pat. No. 6,000,488, which is a division of application No. 08/485,563, filed on Jun. 7, 1995, now Pat. No. 5,609,219, which is a division of application No. 08/387,139, filed on Feb. 10, 1995, now Pat. No. 5,485,894, which is a division of application No. 07/903,696, filed on Jun. 24, 1992, now Pat. No. 5,407,024.

(51) Int. Cl.[7] .......................................... B60K 17/344
(52) U.S. Cl. ..................................................... 180/248
(58) Field of Search .................................. 180/197, 233, 180/247, 248, 249; 192/70.23, 70.27, 70.28; 701/69, 71, 88, 89, 90

(56) References Cited

U.S. PATENT DOCUMENTS

| | | | | |
|---|---|---|---|---|
| 3,476,200 A | * | 11/1969 | Schoepe et al. | ............. 180/248 |
| 4,304,317 A | * | 12/1981 | Vanzant et al. | ............. 180/247 |
| 4,305,490 A | * | 12/1981 | Hendrickson | ................ 180/247 |
| 4,335,430 A | * | 6/1982 | Ohmori et al. | ................. 701/71 |
| 4,441,575 A | * | 4/1984 | Suzuki | ........................ 180/248 |
| 4,597,467 A | * | 7/1986 | Stockton | ..................... 180/248 |
| 4,718,303 A | * | 1/1988 | Fogelberg | .................... 180/249 |
| 4,770,266 A | * | 9/1988 | Yamaguchi et al. | ........ 180/197 |
| 4,987,967 A | * | 1/1991 | Kouno | ........................ 180/233 |

(List continued on next page.)

OTHER PUBLICATIONS

Moroto et al.: "A Computer Controlled Transfer for Four–Wheel Drive Vehicles", Feb. 1985, SAE Technical Paper.*

Nissan Corp.; "Nissan Electronic Torque Split 4WD System", No Date, Nissan Mfg. Literature.*

*Primary Examiner*—Frank Vanaman
(74) *Attorney, Agent, or Firm*—Brinks Hofer Gilson & Lione; Greg Dziegielewski

(57) ABSTRACT

An on demand vehicle drive system monitors vehicle performance and operating conditions and controls torque delivery to the vehicle wheels. The system includes a plurality of speed and position sensors, a transfer case having primary and secondary output shafts driving primary and secondary axles and a microcontroller. The sensors include a vehicle speed sensor, a pair of primary and secondary drive shaft speed sensors, and brake and driveline status sensors. The transfer case includes a modulating electromagnetic clutch controlled by the microcontroller which is incrementally engaged to transfer torque from the primary output shaft to the secondary output shaft. When the speed of either the front or the rear drive shafts overruns, i.e., exceeds, the speed of the other drive shaft by a predetermined value related to the vehicle speed, indicating that wheel slip is present, clutch current is incrementally increased to increase clutch engagement and torque transfer to the secondary axle. When wheel slip is reduced below the predetermined value the current to the clutch is incrementally reduced. The method of operating such a system is also described.

24 Claims, 19 Drawing Sheets

U.S. PATENT DOCUMENTS 4,989,686 A * 2/1991 Miller et al. ................. 180/197
5,083,986 A * 1/1992 Teraoka et al. ............... 475/86
5,119,298 A * 6/1992 Naito .......................... 180/248
5,199,325 A * 4/1993 Reuter et al. ................ 180/233
5,215,160 A * 6/1993 Williams et al. ............ 180/197
5,251,719 A * 10/1993 Eto et al. .................... 180/197

* cited by examiner

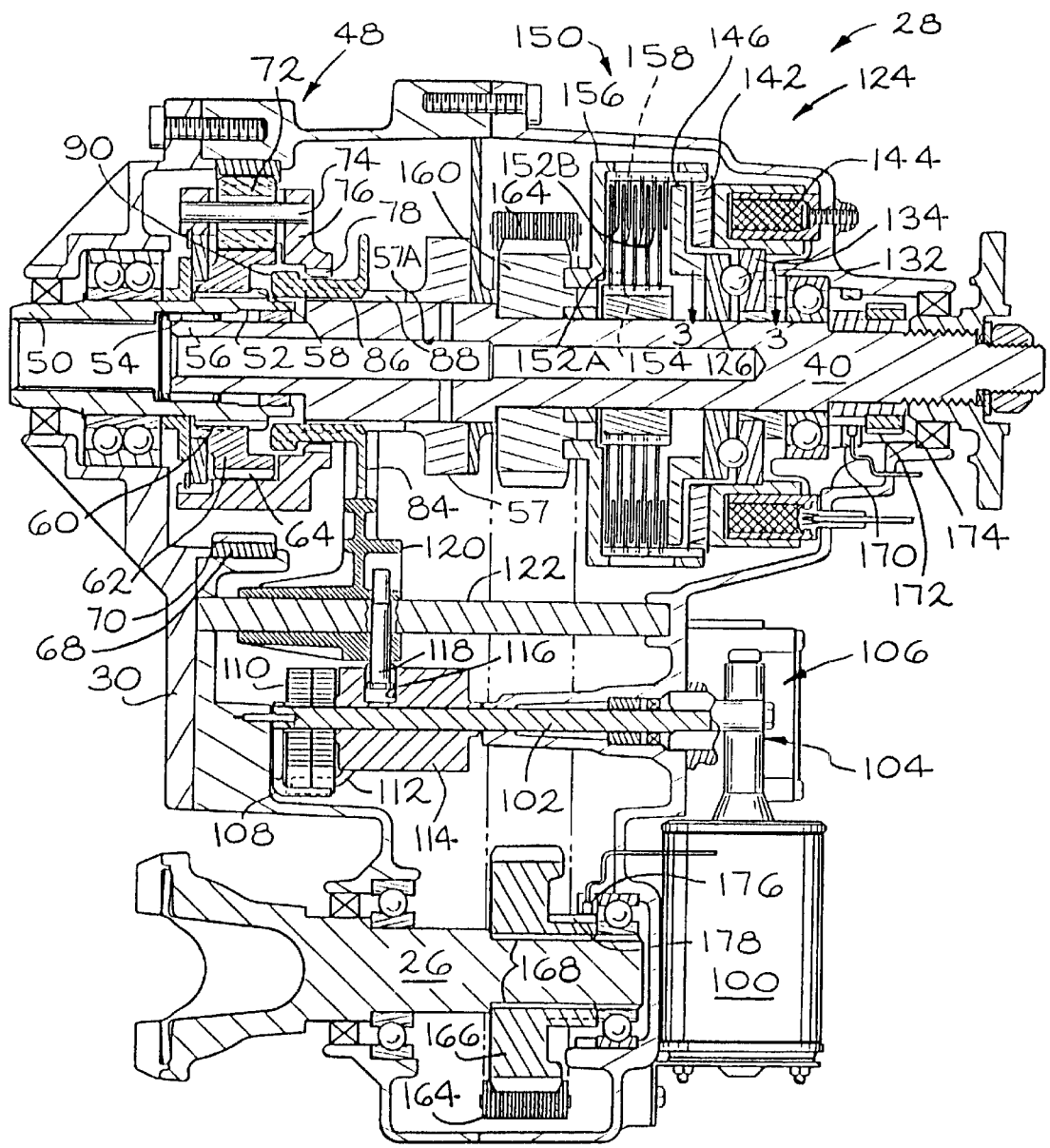

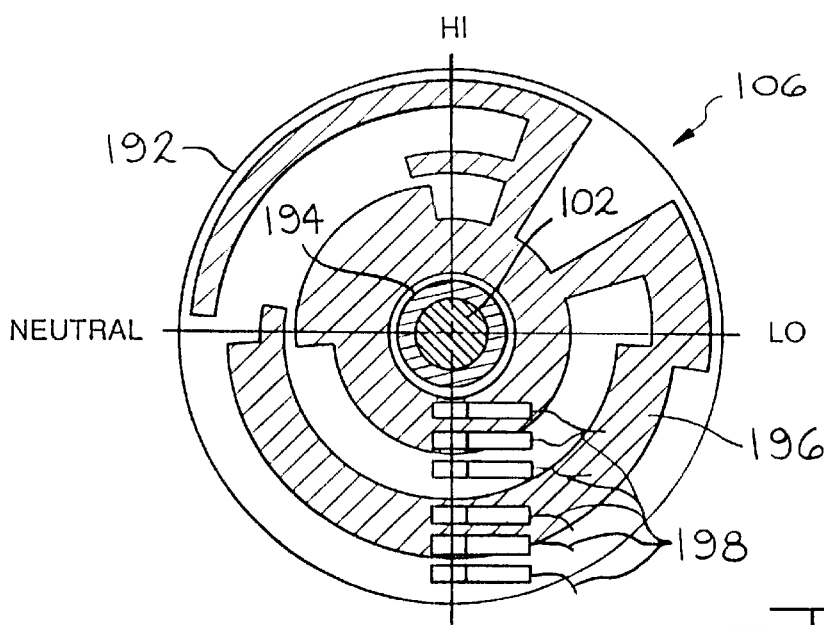
FIG. 6
FIG. 7
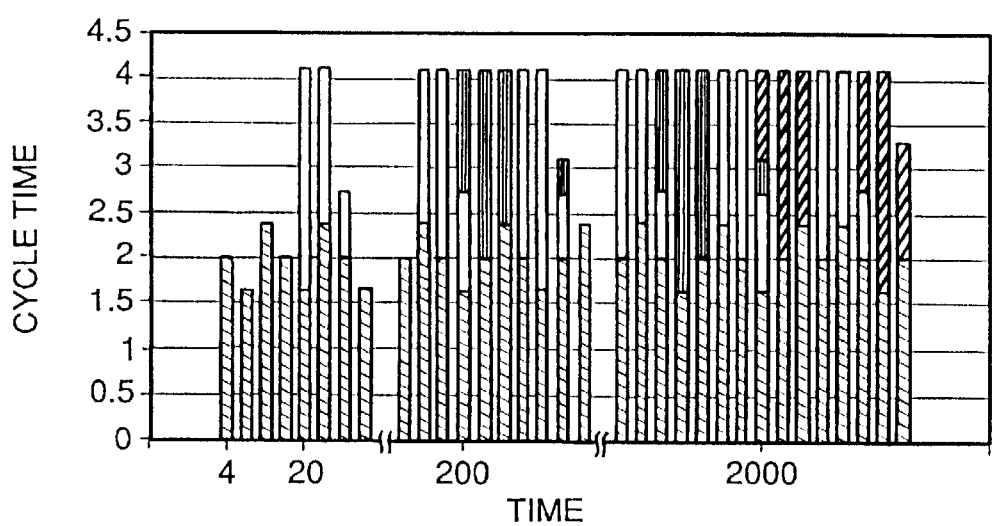
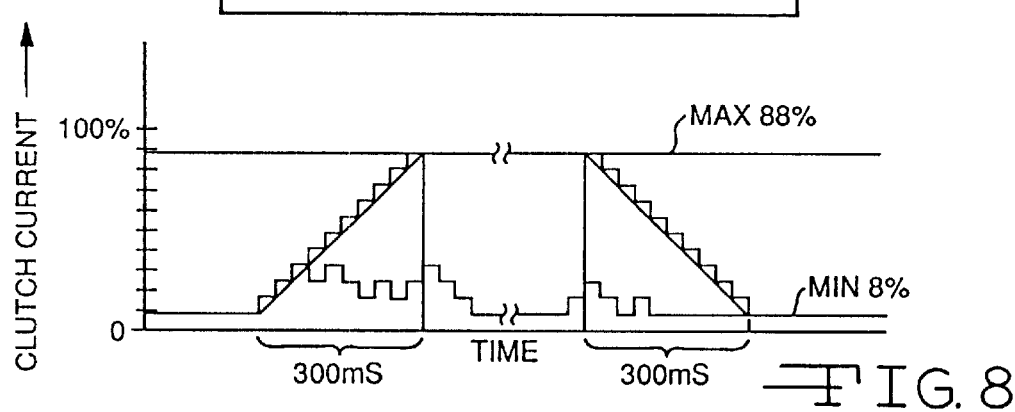
FIG. 8

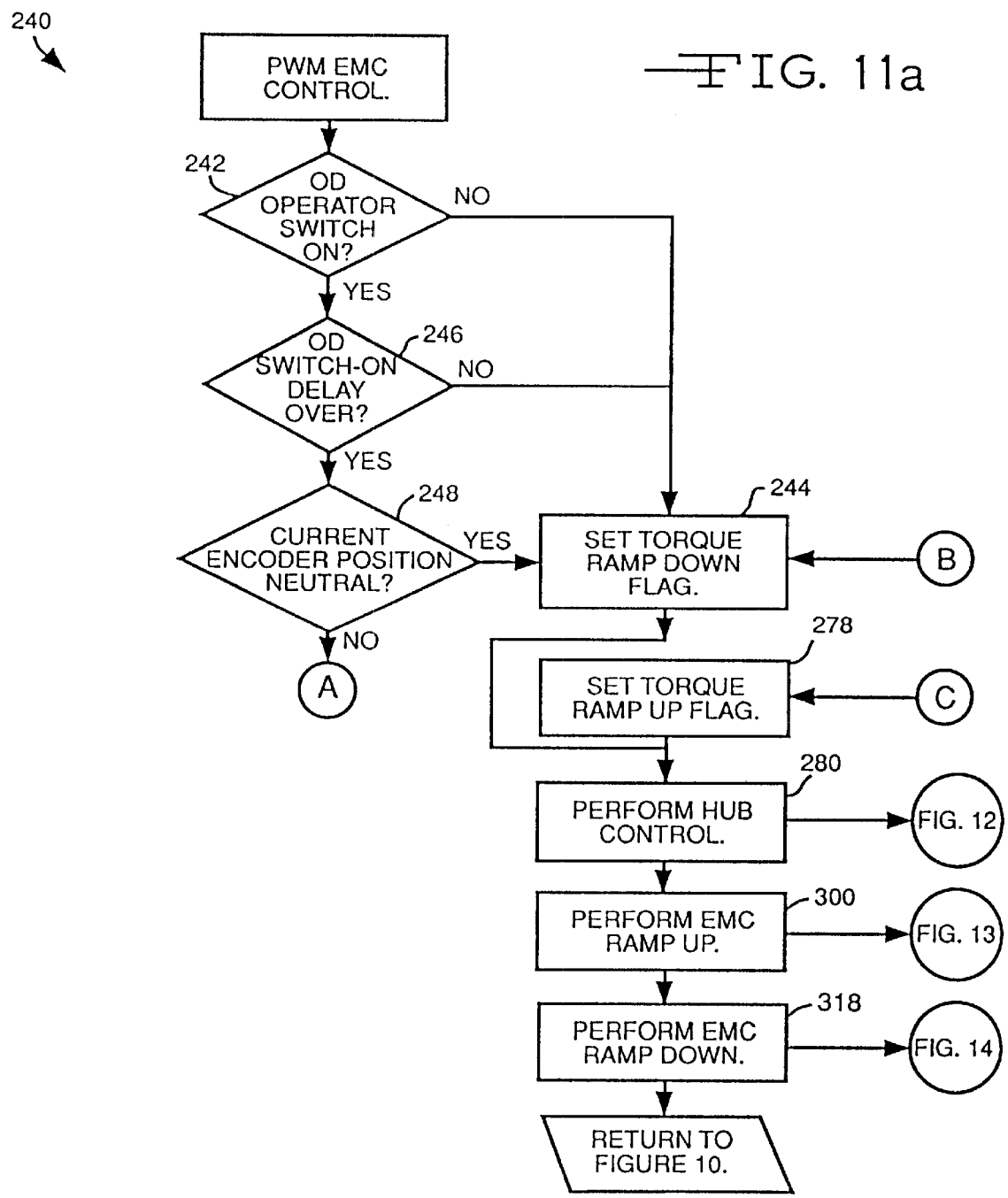

ON DEMAND VEHICLE DRIVE SYSTEM

CROSS REFERENCE TO CO-PENDING APPLICATION

This application is a divisional application of Ser. No. 09/327,140, filed Jun. 7, 1999, now U.S. Pat. No. 6,263,995 granted Jul. 24, 2001 which, in turn, is a divisional application of Ser. No. 08/998,265, filed Dec. 24, 1997 now U.S. Pat. No. 6,062,330 granted May 16, 2000 which, in turn, is a divisional application of Ser. No. 08/814,189 filed Mar. 10, 1997 now U.S. Pat. No. 6,000,488 granted Sep. 21, 1999 which, in turn, is a divisional of Ser. No. 08/485,563, filed Jun. 7, 1995 now U.S. Pat. No. 5,609,219, granted Mar. 11, 1997, which, in turn, is a divisional application of Ser. No. 08/387,139, filed Feb. 10, 1995 now U.S. Pat. No. 5,485,894, granted Jan. 23, 1996, which, in turn, is a divisional application of Ser. No. 07/903,696, filed Jun. 24, 1992, now U.S. Pat. No. 5,407,024, granted Apr. 18, 1995.

BACKGROUND OF THE INVENTION

The invention relates to a four-wheel vehicle drive system and more specifically to an adaptive vehicle drive system which incrementally shifts from two-wheel drive to four-wheel drive upon sensing certain conditions.

The performance advantages of four-wheel vehicle drive systems are well recognized. Improved vehicle stability while traversing rain soaked or ice or snow covered highways, handling and control on gravel or uneven pavement and simply maintaining traction in off road situations are all readily acknowledged benefits. Concomitant and less desirable attributes of four-wheel drive systems relate to reduced gas mileage from increased drive line friction and increased vehicle weight. Such increased drive line friction occurs in part time four-wheel drive systems which rotationally couple the front and rear vehicle propshafts. Such vehicle weight increases are particularly pronounced if the system is designed with a differential between the front and rear drive shafts for full-time engagement and operation rather than intermittent operation when conditions specifically demand it.

Furthermore, while part time four-wheel drive systems which lock the front and rear propshafts together provide obvious benefits of traction and stability in straight line driving, the disparity between the ground speed at the front wheels and the ground speed at the rear wheels during cornering can itself result in wheel slip and hopping of the vehicle. Thus, allowing the front and rear output shafts of the transfer case to operate at different speeds during cornering is beneficial.

Many four-wheel drive systems employing diverse control and torque distribution strategies have been designed and utilized. These various approaches are embodied in United States patents.

For example, U.S. Pat. No. 4,417,641 teaches an automatic four-wheel drive system having an electromagnetic clutch and steering sensor. When the steering wheels are turned greater than a predetermined angle, the electromagnetic clutch is de-energized and two of the driving wheels are disconnected. The system also includes a slip sensor.

U.S. Pat. No. 4,718,303 is co-owned by the assignee herein. It discloses a transfer case having an electromagnetic ramp clutch which is modulated to adjusted the torque distribution in a full time four-wheel drive system.

In U.S. Pat. No. 4,937,750, a microcomputer compares signals from front and rear axle speed sensors. If the difference is greater than a certain value, a clutch is engaged to interconnect the front and rear prop shafts to prevent slip.

U.S. Pat. No. 4,989,686 discloses a full time four-wheel drive system including wheel slip detectors. The output signal from the wheel slip detectors is utilized to drive a proportional clutch which then delivers torque to whichever axle is rotating more slowly. U.S. Pat. No. 5,002,147 discloses a four-wheel drive system which achieves torque splitting between the front and rear axles. The system utilizes four separate wheel speed sensors as well as a steering angle sensor.

In U.S. Pat. No. 5,060,747, a vehicle torque distribution system is taught which includes means for determining both vehicle speed and the difference between the speeds of the front and rear wheels which indicates wheel slip. The vehicle speed data is utilized to correct the sensed wheel speed difference and this corrected value is then utilized to produce a clutch engagement signal.

U.S. Pat. No. 5,090,510 discloses a four-wheel drive system having a differential and a hydraulic clutch disposed in parallel between the front and rear drive shafts. Engagement of the clutch restricts action of the differential to achieve a desired rotational speed difference between the front and rear wheels.

The foregoing review of relevant United States patents reveals many approaches to controlling torque delivery in four-wheel drive vehicles and certain shortcomings as well. Hence, improvements in the art of four-wheel drive vehicle torque delivery systems are both possible and desirable.

SUMMARY OF THE INVENTION

An on demand four-wheel vehicle drive system monitors vehicle performance and operating conditions and controls torque delivery to the vehicle wheels. The vehicle drive system includes a transfer case having primary and secondary output shafts driving primary and secondary axles, a plurality of speed and position sensors and a microcontroller. The speed and position sensors include a vehicle speed sensor which monitors the rotational speed of a wheel of the secondary drive line, a pair of primary and secondary drive line speed sensors, throttle position and steering angle sensors and brake and driveline status sensors. The secondary axle may include coupling components such as locking hubs or an axle disconnect.

The transfer case includes a modulating electromagnetic clutch controlled by the microcontroller which selectively transfers torque from the primary output shaft to the secondary output shaft. A planetary gear assembly or similar device providing high and low speed ranges as well as neutral may also be included in the transfer case.

Selection of the on demand vehicle drive system both provides a minimum (standby) current to the clutch which establishes a minimum torque transfer level and activates the secondary axle engaging components. When the speed of one of the front or rear drive shafts overruns, i.e., exceeds, the speed of the other drive shaft by a predetermined value related to the vehicle speed and the identity of the overrunning shaft, indicating that wheel slip is present, clutch current is incrementally increased to increase clutch engagement and torque transfer to the secondary drive shaft until the speed difference between the drive shafts and thus wheel slip is reduced below the predetermined value. Incremental reduction of the clutch current then occurs. If, as clutch current is reduced, a speed difference exceeding the predetermined value again occurs, indicating that wheel slip is again present, clutch current is increased. Alternatively, if the speed difference and wheel slip remains below the predetermined value, clutch current is reduced until it returns to the minimum current and torque transfer level.

The on demand vehicle drive system may be an active full-time system, may be selectively activated by the vehicle operator or may be automatically activated by driving conditions. The system may be utilized with either primary front wheel or primary rear wheel drive configurations. The clutch may be located anywhere in that portion of the powertrain which delivers torque to the secondary axle, e.g., within the secondary axle differential.

In addition to vehicle speed, the predetermined value is dependent upon whether it is the front or the rear drive shaft (and axles) that is overrunning the other and it may also be dependent upon, for example, steering angle and braking. The clutch may also be incrementally engaged when open engine throttle positions are sensed by the throttle position sensor. The invention offers improvements of lower weight, smaller package size, efficiency, smoothness of operation, fast response and enhanced vehicle handling over current state of the art.

Thus it is an object of the present invention to provide an on demand vehicle drive system which incrementally shifts from primary axle to primary axle and secondary axle torque delivery in response to sensed wheel slip and incrementally returns to primary axle drive when such slip is no longer sensed.

It is a further object of the present invention to provide an on demand vehicle drive system which may be utilized in vehicles having either the front or the rear axle as the primary drive means and the other axle as the secondary drive means which is driven in response to sensed wheel slip.

It is a still further object of the present invention to provide an on demand vehicle drive system which automatically activates and incrementally shifts from two-wheel to four-wheel drive in response to sensed wheel slip.

It is a still further object of the present invention to provide an on demand vehicle drive system which may be manually activated by the vehicle operator and which automatically shifts from two-wheel to four-wheel drive in response to sensed wheel slip.

It is a still further object of the present invention to provide an on demand vehicle drive system which may optionally include a high and low range planetary gear assembly in the transfer case.

It is a still further object of the present invention to provide an on demand vehicle drive system in which the predetermined value of drive shaft overrun causing incremental torque transfer from the primary drive shaft to the secondary drive shaft depends upon vehicle speed and the identity of the overrunning drive shaft.

Further objects and advantages of the present invention will become apparent by reference to the following Description of the Preferred and Alternate Embodiments and appended drawings wherein like reference numerals designate the same components.

BRIEF DESCRIPTION OF THE DRAWINGS

FIG. 2 is a full, sectional view of a transfer case and electromagnetic clutch assembly in an on demand system according to the present invention;

FIG. 3 is a flat pattern development of a section of one clutch ball and associated recesses incorporated in the electromagnetic clutch assembly taken along line 3—3 of FIG. 2;

FIG. 6 is a diagrammatic plan view of an encoder assembly utilized in the present invention to provide data regarding the current position of the transfer case high-neutral-low clutch;

FIG. 7 is a diagrammatic representation of the operation of the interrupt driven routines of a microcontroller according to the present invention;

FIG. 8 is a diagrammatic representation of the incremented and decremented electrical energy provided to the coil of the electromagnetic clutch assembly according to the present invention;

FIG. 11a is a first portion of a flow diagram presenting the operation of the routine of the microcontroller according to the present invention relating to operation of the modulating electromagnetic clutch assembly;

DESCRIPTION OF THE PREFERRED AND ALTERNATE EMBODIMENTS

Figure 1:
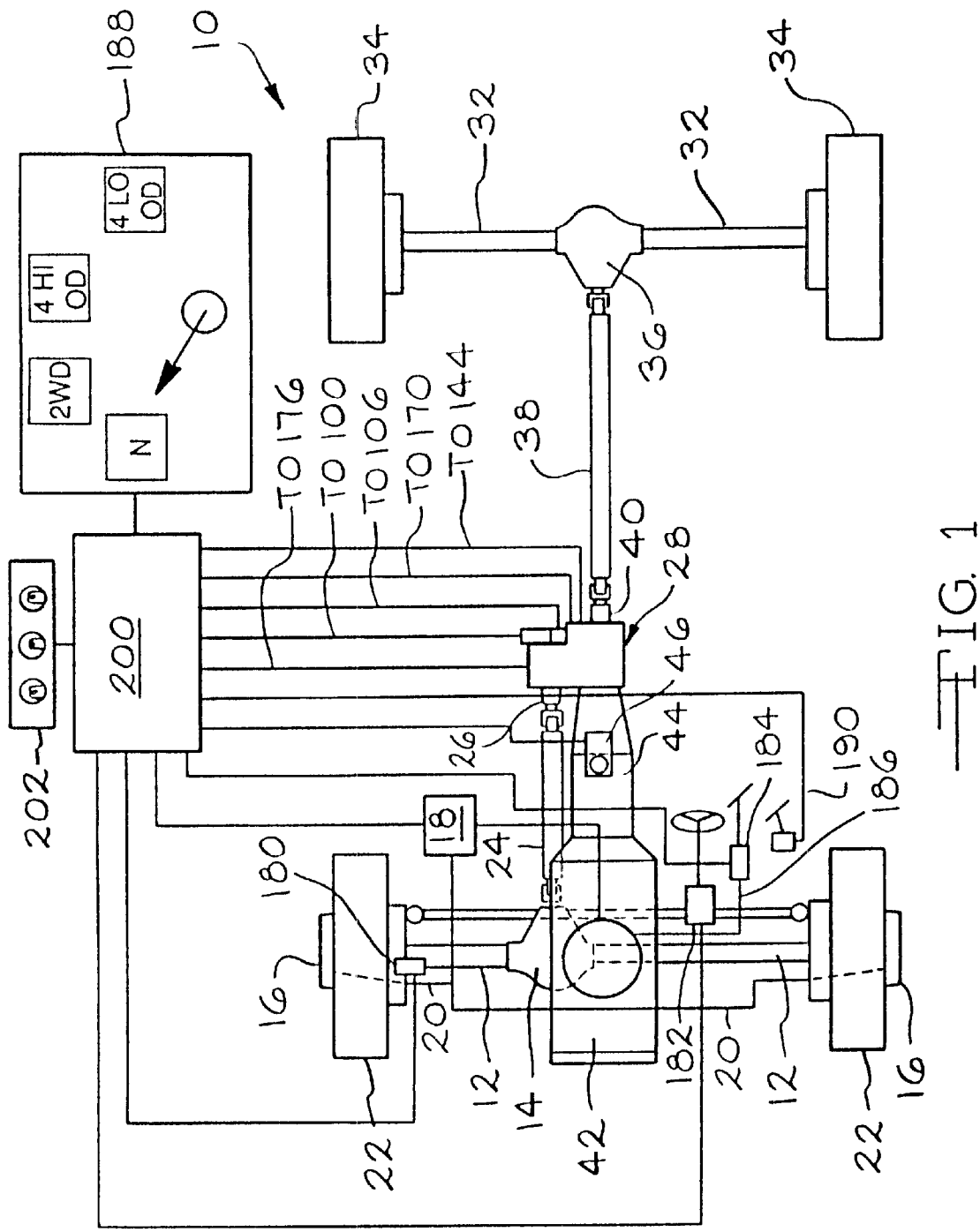
FIG. 1 is a diagrammatic plan view of the drive components and sensors of an on demand vehicle drive system according to the present invention.

Referring now to FIG. 1, an on demand vehicle drive system is illustrated and generally designated by the reference numeral 10. The on demand system 10 is incorporated into a vehicle having a pair of front axles 12. The front axles 12 are centrally coupled to a front differential 14. The outer ends of the front axles 12 are coupled to a respective pair of locking hubs 16. The locking hubs 16 are preferably vacuum operated and are in fluid communication with a solenoid valve 18 through vacuum lines 20. The vacuum may be achieved by any suitable source (not illustrated). When the solenoid valve 18 is energized, the hubs 16 lock and couple the front axles 12 to a respective pair of front tire and wheel assemblies 22. It will be appreciated that electrically operated locking hubs or mechanically operated hubs may be utilized with the present invention. As a further alternative, live front axles 12 may be utilized with a front axle disconnect (not illustrated) disposed in the front differential 14.

The front differential 14 is driven by a front (secondary) drive or prop shaft 24 which, in turn, is driven by the front (secondary) output shaft 26 of a transfer case 28. The transfer case 28 includes a housing 30 (illustrated in FIG. 2) which is preferably cast of metal in two mating sections and includes apertures, blind openings, supports, bearing receiving surfaces and other features specially adapted to receive the components of the transfer case 28.

To the rear of the vehicle are disposed a pair of aligned rear axles 32. The outer ends of the axles 32 are coupled to rear tire and wheel assemblies 34 and their opposite ends are coupled to and driven by a rear differential 36. The rear differential 36, in turn, is driven by a rear (primary) drive or prop shaft 38 which is, in turn, driven by a rear (primary) output shaft 40 of the transfer case 28. It will be appreciated that the various aforementioned shafts are coupled by a plurality of universal joints as needed in accordance with conventional vehicle drive train practice. A prime mover, such as an internal combustion engine 42 drives a conventional transmission 44 which may be either a manual transmission with a clutch or an automatic transmission. In either case, the transmission 44 includes a two state sensor or switch 46. If the transmission 44 is an automatic transmission, the switch 46 provides a signal indicating that the transmission 44 is in neutral. If the transmission 44 is a manual transmission, the switch 46 provides a signal indicating that the clutch is in (disengaged).

Referring now to FIG. 2, it will be appreciated that the transfer case 28 includes a planetary gear assembly 48 which is driven by an input shaft 50 rotatably disposed within the transfer case 28. The input shaft 50 is coupled to and driven by the output of the transmission 44. The input shaft 50 defines a re-entrant bore 52 which receives a roller bearing assembly 54. The roller bearing assembly 54, in turn, receives and rotatably supports the forward terminus 56 of the rear (primary) output shaft 40 of the transfer case 28. A gerotor pump 57 is secured about and rotates with the output shaft 40, providing lubricating fluid under pressure to a passageway 57A which extends axially within the output shaft 40 and distributes lubricating fluid to components of the transfer case 28.

The designations "primary" and "secondary" appearing above refer to drive shafts in an adaptive vehicle drive system, such as the on demand system 10, primarily and secondarily intended to propel the vehicle. In the following description, the inventors describe a system in which the rear drive shaft 38 transmits all drive torque to the rear wheels 34 in two-wheel drive and is the primary drive means in the adaptive four-wheel drive system described herein. Accordingly, in the system 10 the rear drive shaft 38 may, more generically, be referred to or designated the primary drive or prop shaft 38. Conversely, the front drive shaft 24 is disengaged in two-wheel drive mode and may or may not be transferring drive torque in the adaptive four-wheel drive mode described herein. Thus, the front drive shaft 24 may, more generically, be referred to or designated the secondary drive or prop shaft 24.

It should be understood that the system 10 described herein is fully suitable for use with vehicle drive systems conventionally designated front wheel drive where the front drive shaft 24 will be the primary drive shaft and the rear drive shaft 38 will thus be the secondary drive shaft. In this regard, reference to FIGS. 5a and 5b and the accompanying text is suggested.

Turning now to a description of the planetary gear assembly 48, the exterior surface of the input shaft 50 defines a plurality of external teeth 58 which engage complementarily formed teeth 60 on the inner circular surface of a sun gear 62. The sun gear 62 is thus coupled to the input shaft 50 for rotation therewith. The sun gear 62 includes gear teeth 64 about its periphery. Aligned with the sun gear teeth 64 is a ring gear 68 having inwardly directed gear teeth 70. A plurality of pinion gears 72 are rotatably received upon a like plurality of stub shafts 74 which are mounted within a carrier 76. The carrier 76 includes a plurality of inwardly directed teeth 78 on a surface generally adjacent the external teeth 58 defined by the input shaft 50. The planetary gear assembly 48 is more fully described in co-owned U.S. Pat. No. 4,440,042 which is herein incorporated by reference.

An axially sliding, i.e., dog type, clutch 84 is received about the output shaft 40. The clutch 84 defines an inwardly directed plurality of teeth 86 which are complementary to and mate with a like plurality of external teeth 88 disposed on the output shaft 40. The dog clutch 84 thus rotates with the output shaft 40 but may slide axially therealong. The teeth 86 are also complementary to the external teeth 58 on the input shaft 50. The dog clutch 84 also includes a plurality of external teeth 90 which are complementary to the teeth 78 disposed on the carrier 76 and which may be selectively mated therewith.

The dog clutch 84 is axially translatable between a first, forward position wherein the external teeth 58 couple with the teeth 86 and thus provide direct drive between the input shaft 50 and the output shaft 40. Translated fully to the rear, the dog clutch 84 couples the carrier 76 to the output shaft 40 through the mating of the teeth 78 and the external teeth 90. In this position, the speed of the output shaft 40 relative to the input shaft 50 is reduced in accordance with the selected gear ratio of the planetary gear assembly 48. The dog clutch 84 may be also moved to a third, neutral position, mid-way between the forward, direct drive position and the rear, reduced speed drive position. In the middle position, the input shaft 50 is disconnected from the output shaft 40 and no torque is transferred therebetween.

The position of the dog clutch 84 is commanded by an electric shift control motor 100. The electric shift control motor 100 rotates a drive shaft 102 through a worm gear drive 104. The drive shaft 102 is suitably supported for rotation with the housing 30 of the transfer case 28. The position of the drive shaft 102 is monitored and read by an encoder assembly 106 which provides information about the current position of the drive shaft 102 and the dog clutch 84.

The drive shaft 102 terminates in an arm 108 which is coupled to a spring assembly 110. The spring assembly 110 is wrapped about the drive shaft 102 and is also engaged by an arm 112 which extends axially from a cylindrical cam 114. The spring assembly 110 functions as a resilient coupling between the drive shaft 102 and the cylindrical cam 114 to absorb lag between the movement commanded by the drive motor 100 and the driven components so that the shift motor 100 is allowed to reach its final requested position. The spring assembly 110 allows smooth and fast response to a requested repositioning of the dog clutch 84 in situations where the inwardly directed teeth 86 of the dog clutch 84 do not instantaneously engage the external teeth 58 of the input shaft 50 or the external teeth 90 of the dog clutch 84 do not instantaneously engage the teeth 78 of the carrier 76. When rotation of the input shaft 50 allows engagement of the aforementioned clutch teeth, potential energy stored in the spring assembly 110 rotates the cylindrical cam 114 to its requested position, thus completing the shift.

The cylindrical cam 114 defines a helical track 116 which extends approximately 270$_E$ about the cam 114. The helical track 116 receives a pin and cam follower 118 which is coupled to and translates a fork assembly 120. The fork assembly 120 is supported for bi-directional translation upon a fixed shaft 122 and engages the periphery of the dog clutch 84. Rotation of the shaft 102 axially repositions the cam follower assembly 118 and axially positions the dog clutch 84 in one of the three positions described above. It will be appreciated that the planetary gear assembly 48 including the mechanism of the dog clutch 84 which provides dual range, i.e., high and low speed, capability to the transfer case 28 is optional and that the on demand vehicle drive system 10 is fully functional and may be utilized without these components and the dual speed range capability provided thereby.

Figure 4:
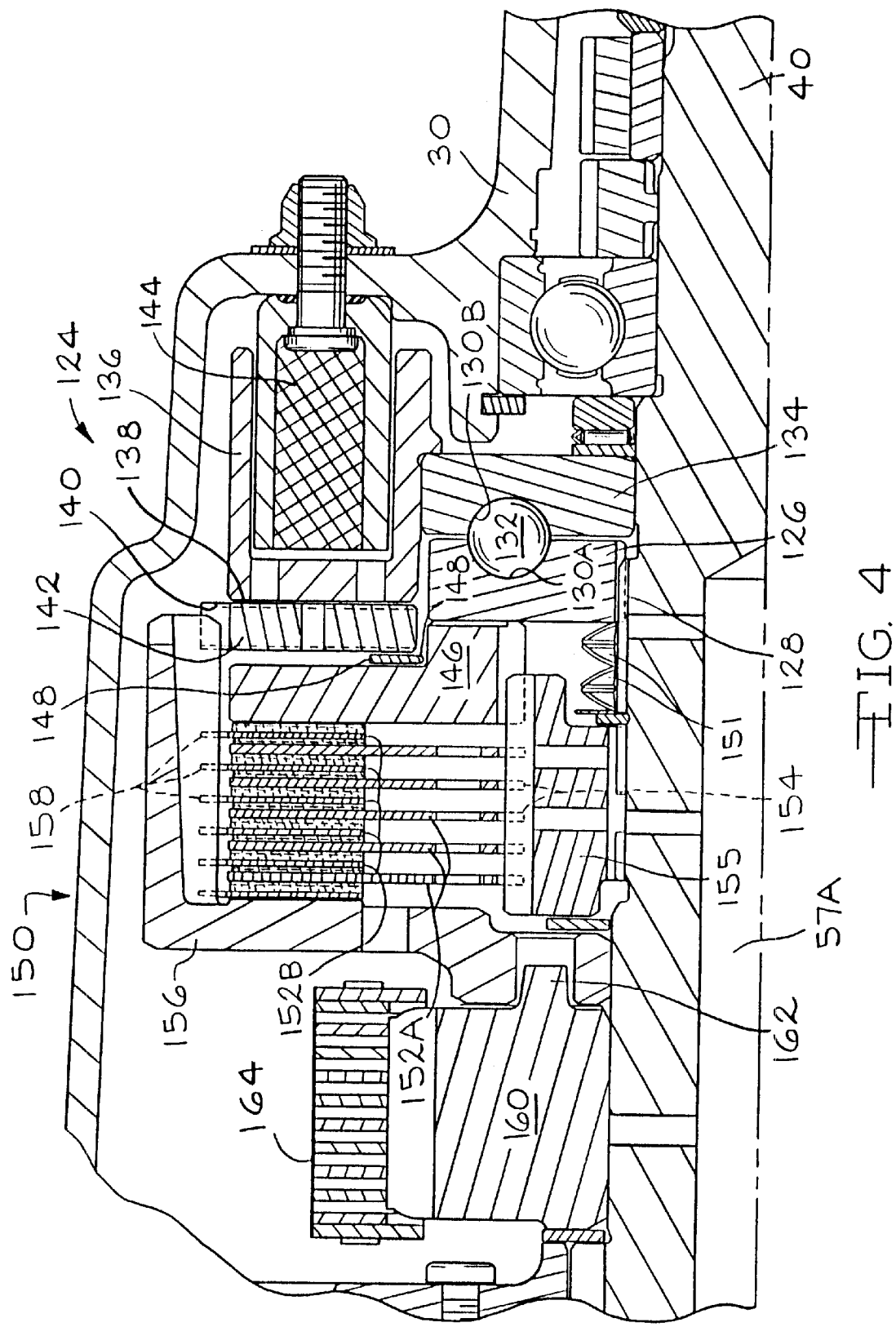
FIG. 4 is an enlarged, fragmentary sectional view of the electromagnetic clutch assembly in an on demand vehicle drive system according to the present invention.

Referring now to FIGS. 2 and 4, the transfer case 28 also includes an electromagnetically actuated disc pack type clutch assembly 124. The clutch assembly 124 is disposed about the output shaft 40 and includes a circular drive member 126 coupled to the output shaft 40 through a splined interconnection 128. The circular drive member 126 includes a plurality of circumferentially spaced apart recesses 130A in the shape of an oblique section of a helical torus, as illustrated in FIG. 3. Each of the recesses 130A receives one of a like plurality of load transferring balls 132.

A circular driven member 134 is disposed adjacent the circular drive member 136 and includes a like plurality of opposed recesses 130B defining the same shape as the recesses 130A. The oblique side walls of the recesses 130A and 130B function as ramps or cams and cooperate with the balls 132 to drive the circular members 126 and 134 apart in response to relative rotation therebetween. It will be appreciated that the recesses 130A and 130B and the load transferring balls 132 may be replaced with other analogous mechanical elements which cause axial displacement of the circular members 126 and 134 in response to relative rotation therebetween. For example, tapered rollers disposed in complementarily configured conical helices may be utilized.

The circular driven member 134 extends radially outwardly and is secured to a electromagnetic coil housing 136. The coil housing 136 includes a face 138 which is disposed in opposed relationship with a clutch face 140 on an armature 142. The coil housing 138 surrounds an electromagnetic coil 144 on three sides.

The electromagnetic coil 144 is provided with incrementally adjusted levels of electrical energy from a pulse width modulation (PWM) control. The pulse width modulation scheme utilized in the present invention is conventional and increases or decreases the average current to the coil 144 of the electromagnetic clutch assembly 124 and thus torque throughput by increasing or decreasing the on time (duty cycle) of a thirty-three (33) Hertz signal. It will be appreciated that other modulating control techniques may be utilized to achieve incremental engagement and disengagement of the modulating clutch assembly 124.

Providing electrical energy to the electromagnetic coil 144 causes magnetic attraction of the armature 142 to the coil housing 136. This magnetic attraction results in frictional contact of the armature 142 to the coil housing 136. When the output shaft 40 is turning at a different speed than the armature 142 which turns at the same rotational speed as the secondary output shaft 26, this frictional contact results in a frictional torque being transferred from the output shaft 40, through the circular drive member 126, through the load transferring balls 132 and to the circular driven member 134. The resulting frictional torque causes the balls 132 to ride up the ramps of the recesses 130A and 130B, causing axial displacement of the circular drive member 126. Axial displacement of the circular drive member 126 translates an apply plate 146 and a washer 148 disposed between the armature 142 and the apply plate 146 axially toward a disc pack clutch assembly 150. A compression spring 151 provides a restoring force which biases the circular drive member 126 toward the circular driven member 134 and returns the load transferring balls 132 to center positions in the circular recesses 130A and 130B to provide maximum clearance and minimum friction between the components of the electromagnetic clutch assembly 124 when it is deactivated.

The disc pack clutch assembly 150 includes a plurality of interleaved friction plates or discs 152. A first plurality of discs 152A are coupled by interengaging splines 154 to a clutch hub 155 which is coupled to the output shaft 40 for rotation therewith. A second plurality of discs 152B are coupled to an annular housing 156 by interengaging splines 158 for rotation therewith. An important design consideration of the recesses 130A and 130B and the balls 132 is that the geometry of their design and the design of the washer 148, the compression spring 151 and the clearances in the clutch assembly 124 ensure that the clutch assembly 124 is not self-locking. The electromagnetic clutch assembly 124 must not self-engage but rather must be capable of modulating clamping of clutch discs 152 and torque transfer in direct response to the incremented or decremented step-wise PWM control input.

Figure 4A:
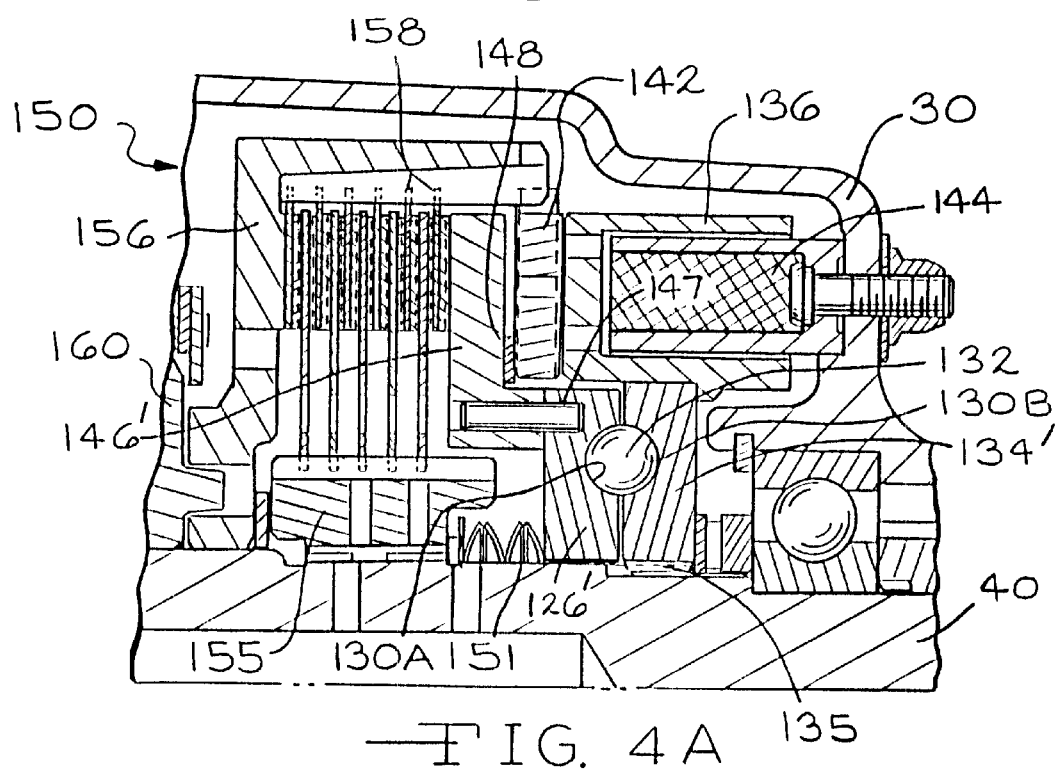
FIG. 4a is an enlarged, fragmentary sectional view of an alternate configuration of the electromagnetic clutch assembly in an on demand vehicle drive system according to the present invention.

Referring briefly to FIG. 4a, it should be appreciated that an alternate embodiment electromagnetic clutch assembly 125 may be utilized in which a circular member 134' is coupled to the shaft 40 by suitable interengaging splines 135 and functions as the drive member. A circular member 126' is disposed for rotation about the shaft 40 and functions as the driven member. The circular member 126' is rotationally coupled to an apply plate 146' through a plurality of interengaging pins and recesses 147. The apply plate 146' is not coupled to the clutch hub 155.

This alternate embodiment electromagnetic clutch assembly 125 also includes the coil housing 136, the armature 142, the electromagnetic coil 144, the washer 148, the disc pack clutch assembly 150 and the spring 151. This configuration increases the frictional torque being transferred through the load transferring balls 132 by the amount of torque resulting from the frictional contact of the apply plate 146' with the adjacent outer clutch disc 152B. This provides higher clutch torque capacity in those applications requiring it. It should be understood that while the preferred clutch assembly 124 and the alternate embodiment clutch assembly 125 described above incorporate electromagnetic activation means, they may also be operated in the same incremental (step-wise) manner by hydraulic or pneumatic operators provided with incrementally controlled pressurized hydraulic fluid or incrementally controlled pressurized air, respectively.

The annular housing 156 is disposed for free rotation about the output shaft 40 and is coupled to a chain drive sprocket 160 by a plurality of interengaging lugs and recesses 162. The drive sprocket 160 is also rotatably disposed on the output shaft 40. When the clutch assembly 124 is engaged, it transfers energy from the output shaft 40 to the chain drive sprocket 160. A drive chain 164 is received upon the teeth of the chain drive sprocket 160 and engages and transfers rotational energy to a driven chain sprocket 166. The driven sprocket 166 is coupled to the front (secondary) output shaft 26 of the transfer case 28 by interengaging splines 168.

The transfer case 28 also includes a first Hall effect sensor 170 which is disposed in proximate, sensing relationship with a plurality of teeth 172 on a tone wheel 174 which is coupled to and rotates with the rear (primary) output shaft 40. A second Hall effect sensor 176 is disposed in proximate, sensing relationship with a plurality of teeth 178 of a tone wheel disposed on the driven sprocket 166. Preferably, the number of teeth 172 on the tone wheel 174 is identical to the number of teeth 178 on the tone wheel of the driven sprocket 166 so that identical shaft speeds result in the same number of pulses per unit time from the Hall effect sensors 170 and 176. This simplifies computations relating to shaft speeds and improves the accuracy of all logic decisions based on such data and computations. As to the actual number of teeth 172 on the tone wheel 174 and teeth 178 on the tone wheel of the driven sprocket 166, it may vary from thirty to forty teeth or more or fewer depending upon rotational speeds and sensor construction. The use of thirty-five teeth on the tone wheels has provided good results with the Hall effect sensors 170 and 176 and is therefore the presently preferred number of teeth.

The first and second Hall effect sensors 170 and 176 sense the respective adjacent teeth 172 and 178 and provide a series of pulses which may be utilized to compute the instantaneous rotational speeds of the front output shaft 26 and the rear output shaft 40 which, of course, correspond to the rotational speeds of the front drive shaft 24 and the rear drive shaft 38. These rotational speeds may be utilized to infer the speed of the vehicle as well as determine overrunning by either the front or the rear drive shafts relative to the other which represents wheel spin and thus wheel slip. Hall effect sensors are preferred inasmuch as they provide an output signal which alternates between a well defined high and low signal value as the sensed teeth pass.

It will be appreciated that other sensing devices such as, for example, variable reluctance sensors may be utilized. Such sensors do not, however, provide the clean wave form provided by Hall effect sensors, particularly at low shaft speeds, and thus may require extra input conditioning to provide useable data. It should also be appreciated that the Hall effect sensors 170 and 176 and their respective adjacent teeth 172 and 178 are preferably located within the housing 30 of the transfer case 28 but may be located at any convenient site along the primary and secondary drive lines.

Alternatively, a first pair of Hall effect sensors and tone wheels may be disposed to sense rotation of the rear (primary) tire and wheel assemblies 34 and a second pair of Hall effect sensors and tone wheels may be disposed to sense rotation of the front (secondary) tire and wheel assemblies 22. The average of the outputs of the first pair of sensors is functionally equivalent to the speed of the rear drive shaft 38 and the average of the outputs of the second pair of sensors is functionally equivalent to the speed of the front drive shaft 24.

Referring again to FIG. 1, the system 10 also includes a plurality of two position and variable sensors. As used herein, variable refers not only to analog devices such as potentiometers but also to digital devices having pulsed or digitally coded outputs providing appropriately high resolution of the sensed variable. A vehicle speed sensor 180, such as a Hall effect sensor, is disposed in sensing relationship with a tone wheel on one of the front (secondary) drive wheels 22 to provide an auxiliary indication of vehicle speed. When the vehicle is stuck in, for example, deep snow, the vehicle speed sensor 180 also provides an indication that the vehicle is stationary while the primary drive wheels are rotating. This situation presents a danger to the locking hubs 16 which might otherwise engage during a period of high torque delivery to the front (secondary) tire and wheel assemblies 22. In this situation, the system 10 commands staged, i.e., sequential, engagement of first the locking hubs 16 and then the electromagnetic clutch assembly 124 according to the subroutine illustrated in FIG. 12 and described in the accompanying text.

A steering angle sensor 182 provides a signal indicating the angular position of the front tire and wheel assemblies 22. The sensor 182 may provide a signal having a null point when the front tire and wheel assemblies 22 are positioned straight ahead and increase when moved to either side; provide a null on center and a negative signal to one side and a positive signal to the other or a ramp signal having a minimum value at one end of travel of the steering linkage and a maximum value at the other end. Alternatively, the steering angle sensor 182 may provide logic signals at preselected angular positions of the front tire and wheel assemblies 22. Information from the steering angle sensor 182 is utilized to adjust the threshhold values of drive shaft speed difference which incrementally engage the clutch assembly 124 as will be more fully explained below.

The system 10 may also include a throttle angle sensor 184 coupled to a throttle linkage 186 of the internal combustion engine 42. The throttle angle sensor 184 may provide either a variable output or indicate that specific throttle settings, such as idle, one-quarter throttle, one-half throttle or three-quarters throttle, have been achieved or exceeded.

Another control input is provided by a multiple position, driver selectable switch 188. The switch 188 defines four positions which request one of the following conditions: neutral in which the dog clutch 84 is engaged to neither the output of the carrier gear 76 nor the teeth 58; two-wheel drive in which the dog clutch 84 is engaged to the teeth 58 to provide direct drive through the transfer case 28 to the rear (primary) output shaft 40 and the on demand system 10 and the electromagnetic clutch assembly 124 are disabled; four-wheel drive high with the on demand system 10 engaged in which the dog clutch 84 is engaged to the teeth 58, the on demand system 10 is activated and operates according to the sequence of operating steps to be described below and four-wheel drive low with the on demand system 10 engaged in which the dog clutch 84 is engaged to the planetary gear carrier 76 to provide a low range output and the electromagnetic clutch assembly 124 is energized and engaged at all times to provide torque through the output shaft 40 to the rear (primary) drive wheels 34 and through the front (secondary) output shaft 36 to the front wheels 22.

An additional operating mode which fully engages the modulating electromagnetic clutch in the high range of the planetary gear assembly 48 may be added or substituted for one of the above delineated operating modes to provide conventional four-wheel drive operation functioning the same as a four-wheel drive, part time transfer case discussed above, if suitable for the particular vehicle application.

The system 10 also includes a two position brake switch 190 which is activated when the vehicle braking system is activated and provides a two state logic signal indicating that the vehicle brake pedal is depressed. A signal may be provided from the ABS braking system of the vehicle, if so equipped, which indicates that the ABS is active. Such an ABS signal may replace or be in addition to the signal from the brake switch 190.

Figure 5A:
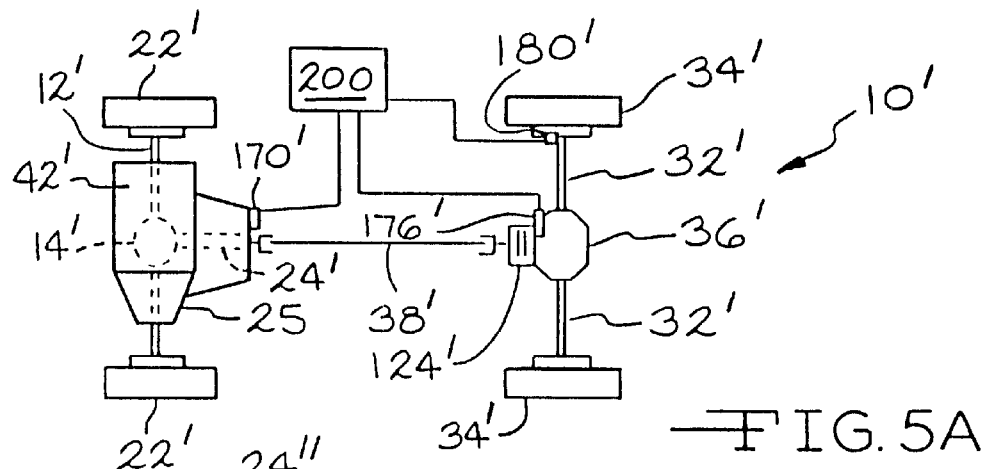
FIG. 5a is a diagrammatic plan view of a first alternate embodiment of an on demand vehicle drive system according to the present invention.

Referring now to FIG. 5*a*, a first alternate embodiment of the on demand vehicle drive system 10' is illustrated. The alternate embodiment system 10' is similar to the system 10 illustrated in FIG. 1 except that the primary drive wheels are located at the front of the vehicle, the locking hubs have been eliminated and the electromagnetic clutch assembly 124 has been relocated to the rear axle differential housing. Locations of certain of the sensors have also been changed.

The alternate embodiment system 10' thus includes a pair of front (primary) axles 12' coupled at one end to a respective pair of front tire and wheel assemblies 22' and operably coupled at their other ends to a front (primary) differential 14'. A front (primary) drive shaft 24' drives the front differential 14' from the front (primary) output of a transaxle 25.

At the rear of the vehicle are disposed a pair of rear axles 32' coupled at their outer ends to a respective pair of rear (secondary) tire and wheel assemblies 34'. The inner ends of the rear axles 32' are coupled to a rear differential 36'. A rear (secondary) drive shaft 38' is coupled to the rear (secondary) output of the transaxle 25 and drives the rear differential 36' through an electromagnetic clutch assembly 124'. The transaxle 25 includes a right angle drive to the rear drive shaft 38'. A transversely mounted internal combustion engine 42' drives the transaxle 25.

Sensors include a first Hall effect sensor 170' which senses the speed of the front (primary) drive shaft 24'. A second Hall effect sensor 176' senses the speed of the shaft disposed between the output of the electromagnetic clutch assembly 124' and the rear differential 36'. A third Hall effect sensor 180' provides an accurate indication of vehicle speed by sensing the speed of rotation of one of the rear (secondary) tire and wheel assemblies 34'. The first alternate embodiment system 10' therefore illustrates, first of all, the adaptability of the system 10 to various driveline configurations, namely, primary front wheel drive. It further illustrates that the electromagnetic clutch assembly 124' may be moved from the transfer case 28 and disposed within the housing of the rear differential 36'.

Figure 5B:
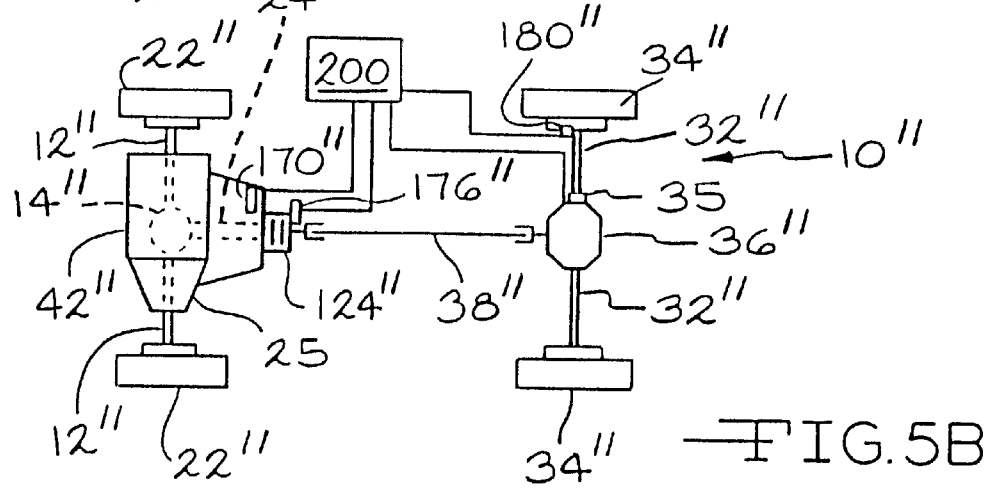
FIG. 5b is a diagrammatic plan view of a second alternate embodiment of an on demand vehicle drive system according to the present invention.

Referring now to FIG. 5*b*, a second alternate embodiment of the on demand vehicle drive system 10" is illustrated. The second alternate embodiment system 10" is also similar to the system 10 illustrated in FIG. 1 and is similar to the first alternate embodiment 10' in that the primary drive wheels are located at the front of the vehicle. The electromagnetic clutch assembly 124" is disposed at the front of the vehicle, adjacent the rear of the transaxle 25. Locations of certain of the sensors have again been changed.

The second alternate embodiment system 10" thus includes a pair of front (primary) axles 12" coupled at one end to a respective pair of front tire and wheel assemblies 22" and operably coupled at their other ends to a front (primary) differential 14". A front (primary) drive shaft 24" drives the front differential 14" from the output of the transaxle 25.

At the rear of the vehicle are disposed a pair of rear axles 32" coupled at their outer ends to a respective pair of rear (secondary) tire and wheel assemblies 34". The inner ends of the rear axles 32" are selectively engaged by an axle disconnect 35 to a rear differential 36". A rear (secondary) drive shaft 38" is driven by the output of an electromagnetic clutch assembly 124". A transversely mounted internal combustion engine 42" drives the transaxle 25 which in turn also drives the input of the electromagnetic clutch assembly 124".

Sensors include a first Hall effect sensor 170" which senses the speed of the front (primary) drive shaft 24". A second Hall effect sensor 170" senses the speed of the (secondary) drive shaft 38" disposed between the output of the electromagnetic clutch assembly 124" and the rear differential 36". A third Hall effect sensor 180" provides an accurate indication of vehicle speed by sensing the speed of rotation of one of the rear (secondary) tire and wheel assemblies 34". The second alternate embodiment system 10" further illustrates the adaptability of the system 10 to various driveline configurations, namely, a primary front wheel drive configuration in which the electromagnetic clutch assembly 124", is disposed adjacent the transaxle 25 and an axle disconnect 35 is disposed at the rear differential 36".

It will be appreciated that other combinations of placements of the above discussed components are possible and wholly within the scope of the present invention. That is, axle disconnects within a differential housing as illustrated in FIG. 5*b* may be utilized in a system wherein the electromagnetic clutch assembly 124 is disposed within the housing 30 of the transfer case 28 as in the preferred embodiment system 10. Or, for example, the locking hubs 16 of the preferred embodiment system 10 may be utilized at the rear (secondary) tire and wheel assemblies 34' of the first alternate embodiment 10".

Referring now to FIG. 6, an encoding wheel 192 of the encoding assembly 106 is illustrated. The encoding wheel 192 is fabricated of insulating material and includes a centrally disposed bushing 194 which preferably defines an asymmetrical opening or may include either a set screw or a keyway (both not illustrated) which registers the encoding wheel 192 on the asymmetrically complementary drive shaft 102. The encoding wheel 192 includes a plurality of irregular, generally arcuate electrical contacts 196 which are arranged in concentric, generally circular tracks. The electrical contacts 196 in any given track are separated by open (insulated) areas. Preferably, an innermost pair of wiper contacts 198 are connected to a low logic voltage source. They may, however, be connected to any appropriate voltage source. An outer group of four wiper contacts 198 are aligned with each of the tracks 196. As the encoding wheel 192 rotates through $270_E$, the group of four electrical contacts 198 receive signals which comprise a four bit Gray code. The four bit Gray code defines hexidecimal values from 0 to F and the values represent distinct sectors of the encoder wheel 192 and the drive shaft 102. The position of the drive shaft 102 over approximately $270_E$ of rotation can thus be determined with good accuracy by reading the Gray code data provided by the encoder assembly 106.

The following Table I presents the hexidecimal values read by the contacts 198 and the positions of the encoder wheel 192. It should be noted that the specific pattern of the electrical contacts 196 illustrated in FIG. 6 provides improved angular resolution adjacent the neutral, high and low positions of the dog clutch 84 and reduced resolution in the intermediate positions.

TABLE I

| CONTACTS | POSITION | | | | |
|---|---|---|---|---|---|
| (198) | High | Mid High | N | Mid Low | Low |
| INNER | 0 | 1 | 1 | 0 | 0 |
| INNER MIDDLE | 1 | 0 | 1 | 1 | 0 |
| OUTER MIDDLE | 0 | 0 | 0 | 1 | 1 |
| OUTER | 1 | 1 | 0 | 0 | 1 |

All of these signals are provided to a microcontroller 200. The microcontroller 200 may be located at any convenient location within the motor vehicle or may be disposed within and protected by the housing 30 of the transfer case 28. The microcontroller 200 utilizes an interrupt driven program which functions with four internal loops having distinct cycle times. A first minor loop, which shall be designated LOOP1, includes the routine for directing movement of the shift control motor 100. A new LOOP1 is commenced every 4.12 milliseconds. A second loop, designated LOOP2, includes routines which monitor the Hall effect sensors 170, 176 and 180 compute the vehicle speed, control the locking hubs 16, enable, operate and disable the electromagnetic clutch assembly 124 and accept new commands from the switch 188. Execution of LOOP2 routines begins every 20.5 milliseconds.

A third and still longer loop begins every 200 milliseconds and is designated LOOP3. LOOP3 includes routines which monitor the status and operating condition of the overall system 10 and drive a plurality of dashboard indicator lights and displays 202, illustrated in FIG. 1, which provide information to the vehicle operator. Finally, the microcontroller 200 includes a fourth loop, designated LOOP4, which beings execution every 2000 milliseconds (two seconds). LOOP4 includes routines relating to various diagnostic activity and displays related thereto. Certain diagnostic activity from LOOP4 are also presented to the operator of the vehicle by the plurality of dashboard indicator lights 202.

The interleaved operation of these loops is illustrated diagrammatically in FIG. 7. Every 4.12 milliseconds, LOOP1 begins execution of the routines included therein. Every fifth execution of LOOP1, that is, every 20.5 milliseconds, execution of the routines of LOOP2 commence after LOOP1 routines have been completed. This cycle continues until 200 milliseconds have elapsed at which time LOOP3 is begun after LOOP1 and LOOP2 have been completed. Finally, after two seconds have elapsed, LOOP4 will begin execution after LOOP1, LOOP2 and LOOP3 have been completed. It will be appreciated that any higher numbered loop, if not completed prior to commencement of the execution of a lower numbered loop in accordance with the given loop execution cycle times, will be interrupted in accordance with the cycle start time of the lower numbered loop, hence the designation "interrupt driven".

Figure 9A:
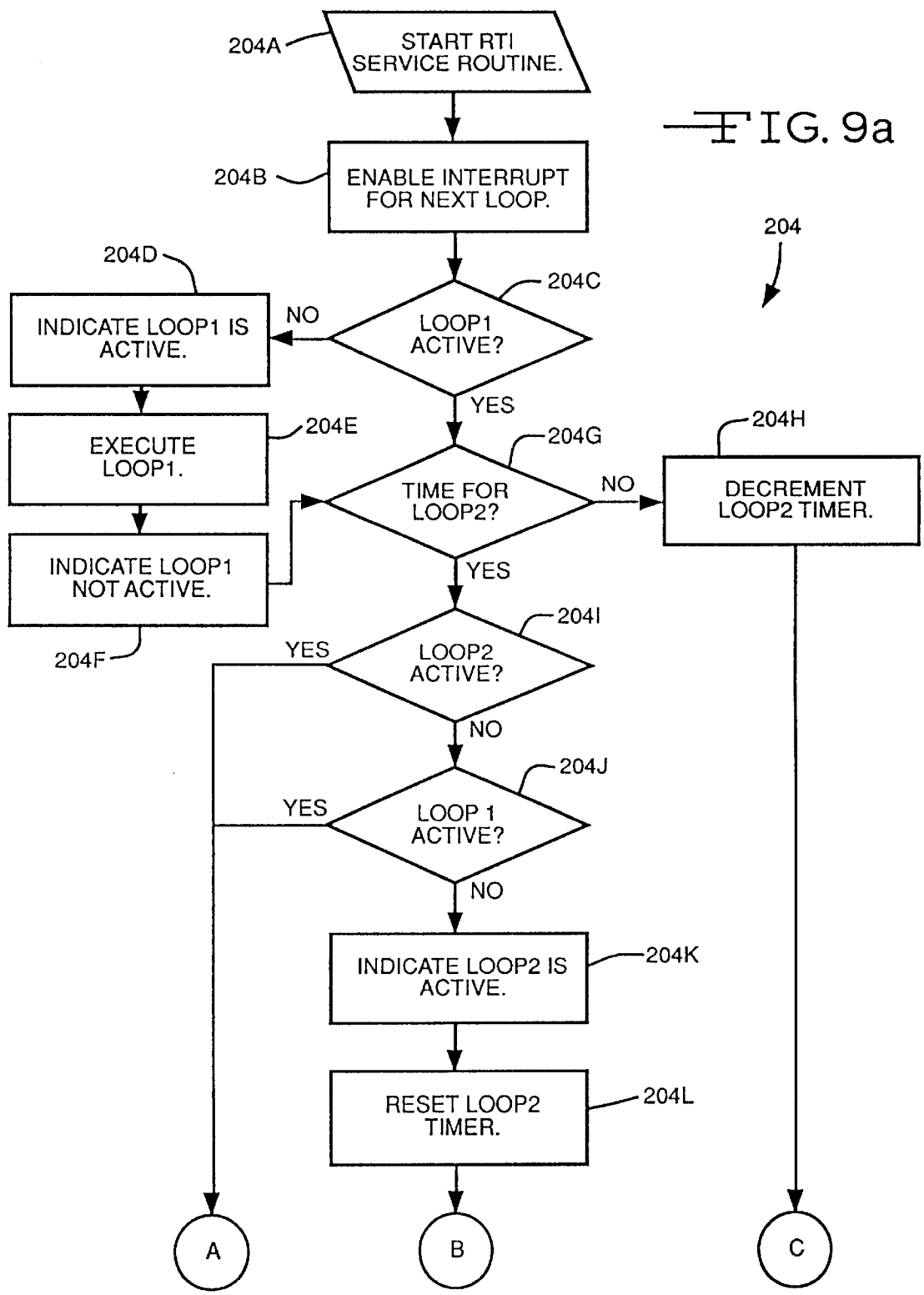
FIG. 9a is a first portion of a flow diagram presenting the operation of the real time interrupt executive of the microcontroller according to the present invention.

Referring now to FIG. 9a, the real time interrupt executive commences at an initializing step 204A which starts the real time interrupt service routine. The executive 204 then moves to a process step 204B which enables the real time interrupt executive for the next loop. From the process step 204B, the executive 204 moves to a decision point 204C which enquires whether LOOP1 and its associated routines are active. If LOOP1 is not active, the executive 204 branches from the decision point 204C at NO and enters a process step 204D which provides an indication that LOOP1 is active and moves to a process step 204E which executes the routines of LOOP1. When execution of LOOP1 is complete, the process step 204E is exited and the executive 204 moves to a process step 204F which provides an indication that LOOP1 is no longer active and moves to a decision point 204G. The decision point 204G determines if it is time to execute the routines and subroutines of LOOP2. If it is not, the executive 204 branches at NO of the decision point 204G and enters a process step 204H which decrements the LOOP2 timer. If it is time to execute LOOP2, the decision point 204G is exited at YES and the executive 204 moves to a decision point 204I which enquires whether LOOP2 is active. If LOOP2 is not active the decision point 204I is exited at NO and the executive 204 moves to a decision point 204J which enquires whether LOOP1 is active. If LOOP1 is not active, the decision point 204J is exited at NO and the executive 204 moves to a process step 204K which indicates that LOOP2 is active. Next, the process step 204L is executed which resets the LOOP2 timer. Returning to the decision point 204I, if LOOP2 is active, the decision point 204I is exited at YES. Likewise, if LOOP1 is active the decision point 204J is exited at YES.

Figure 9B:
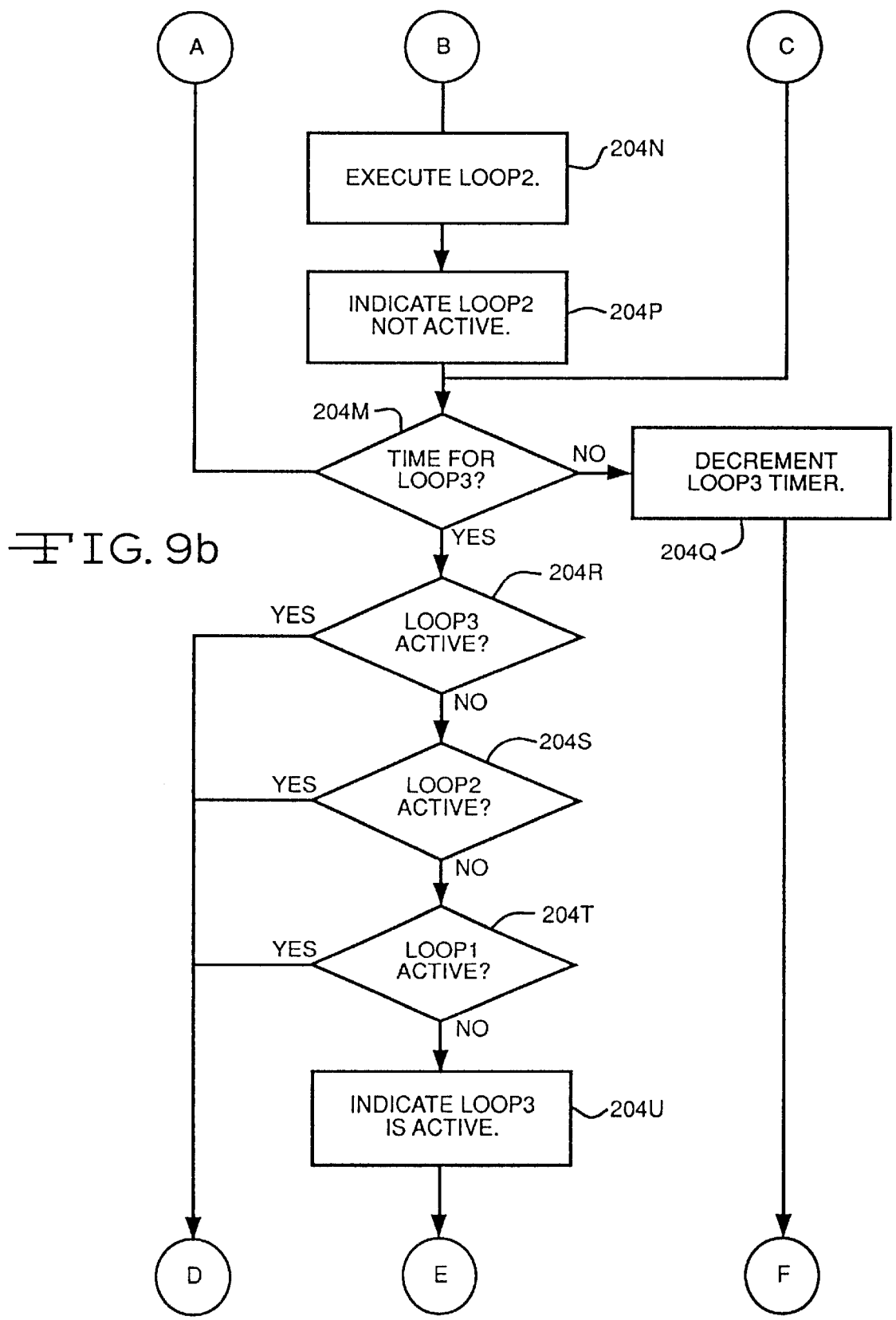
FIG. 9b is a second portion of a flow diagram presenting the operation of the real time interrupt executive of the microcontroller according to the present invention.

Referring now to FIGS. 9a and 9b, in both of the above cases, the executive 204 moves to a decision point 204M which enquires if it is time to execute LOOP3. After the LOOP2 timer is reset in the process step 204L, the executive 204 commands execution of the routines and subroutines of LOOP2 at a process step 204N if time is available. Upon either the completion of the routines and subroutines of LOOP2 or the expiration of available time in which to complete same, execution of LOOP2, a process step 204P then provides an indication that LOOP2 is no longer active. From the process step 204P, the executive 204 moves to the decision point 204M. Upon completion of the process step 204H which decrements the LOOP2 timer, the executive 204 also enters the decision point 204M which as noted previously, enquires whether it is time to execute the routines and subroutines of LOOP3. If it is not time to execute LOOP3, the decision point 204M is exited at NO and the executive 204 enters a process step 204Q which decrements the LOOP3 timer. If it is time to execute the routines and subroutines of LOOP3, the decision point 204M is exited at YES and the executive 204 moves to a decision point 204R which enquires whether LOOP3 is active. If LOOP3 is not active, the decision point 204 is executed at NO and the executive 204 moves to a decision point 204S which enquires whether LOOP2 is active. If LOOP2 is not active, the decision point 204S is exited at NO and the executive 204 moves to a decision point 204T which enquires whether LOOP1 is active. If it is not, the executive 204 moves to a process step 204U which provides an indication that LOOP3 is active.

Figure 9C:
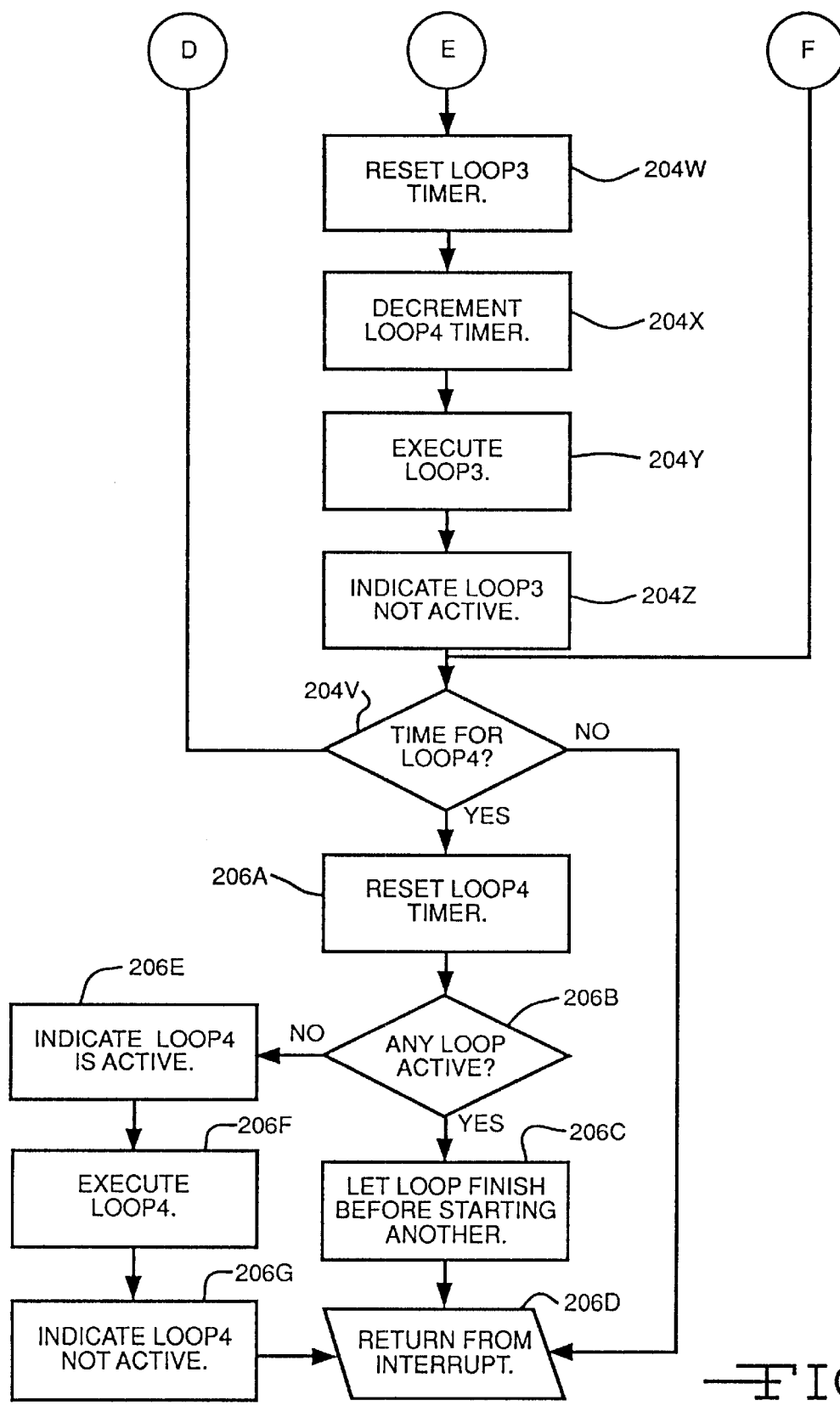
FIG. 9c is a third portion of a flow diagram presenting the operation of the real time interrupt executive of the microcontroller according to the present invention.

Referring now to FIGS. 9b and 9c and returning to the decision point 204R, if LOOP3 is active the decision point 204R is exited at YES and moves to a decision point 204V. Likewise, if the decision point 204S determines that LOOP2 is active, it is exited at YES and the executive 204 moves to the decision point 204V. Finally and likewise, if LOOP1 is active, the decision point 204T is exited at YES and the executive 204 also moves to the decision point 204V.

Upon completion of the process step 204U illustrated in FIG. 9b, the executive 204 moves to a process step 204W which resets the LOOP3 timer. Then, the executive 204 enters a process step 204X which decrements the LOOP4 timer and to a process step 204Y which executes the routines and subroutines of LOOP3 if time is available. Upon either the completion of the routines and subroutines of LOOP3 or the expiration of available time in which to complete same, the executive 204 moves to a process step 204Z which provides an indication that LOOP3 is no longer active. The executive 204 then moves to the decision point 204V. The decision point 204V may also be arrived at from the output of the process step 204Q which decrements the LOOP3 timer.

The decision point 204V determines whether it is time to execute the routines and subroutines of LOOP4. If it is, the decision point 204V is exited at YES and the executive 204 enters a process step 206A which resets the LOOP4 timer and then enters a decision point 206B which determines whether any of the four loops are presently active. If any of the loops are active, the decision point 206B is exited at YES and the executive 204 moves to a process step 206C which permits the then active loop to finish before another loop is started. When the process step 206C is completed, the executive 204 returns from a interrupt at the step 206D.

Returning to the decision point 206B, if any loop is active, the decision point 206B is exited at NO and the executive 204 enters a process step 206E which indicates that LOOP4 is active and then moves to a process step 206F which executes the routines and subroutines of LOOP4 if time is available. Upon completion of the routines and subroutines of LOOP4 or as much of the routines and subroutines as time allows, the executive 204 moves to a process step 206G which indicates that LOOP4 is no longer active and then returns from the interrupt at the step 206D. Finally, returning to the decision point 204V, if it is not time for the execution of LOOP4, the decision point 204V is exited at NO and the executive 204 also returns from the interrupt at the step 206D.

Figure 10:
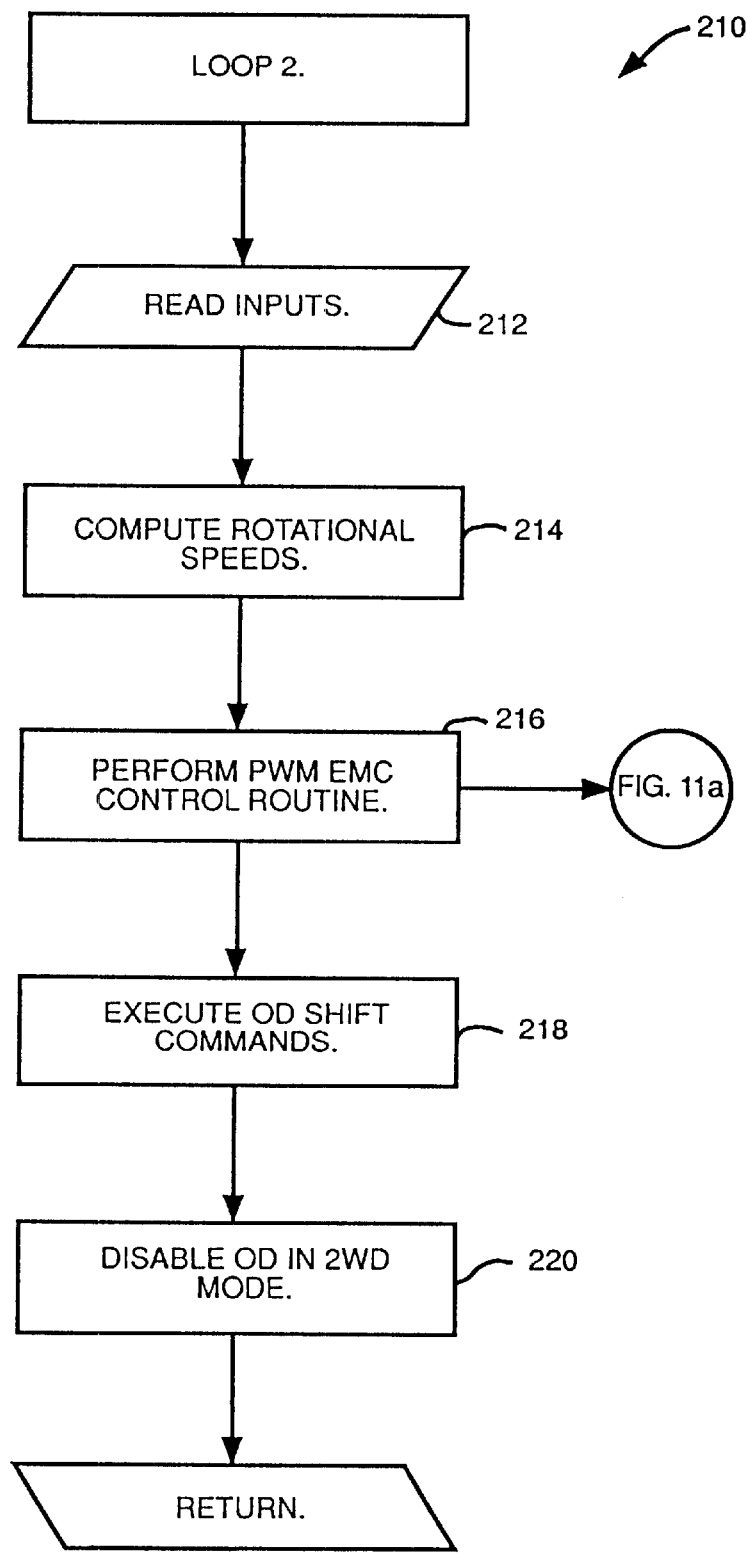
FIG. 10 is a flow diagram presenting the operation of the routine of the microcontroller according to the present invention relating to initializing the system and computing vehicle speed.

Referring now to FIG. 10, a first routine 210 appearing in LOOP2 relates to the reading and computation of vehicle speed. The vehicle speed routine 210 commences with an initializing step 212 which reads the signals provided by the Hall effect sensors 170, 176 and 180 and all other sensors including the neutral switch 46, the steering angle sensor 182, the throttle angle sensor 184, the driven selectable switch 188 and the brake switch 190. The signal provided by the Hall effect sensor associated with the more slowly rotating output shaft and drive shaft (either the front output shaft 26 and the front drive shaft 24 or the rear output shaft 40 and the rear drive shaft 38) is utilized to infer the speed of the vehicle. Thus, if the rear output shaft 40 and the rear drive shaft 38 are rotating more slowly, the Hall effect sensor 170 provides the signal which is utilized to infer the vehicle speed. If, on the other hand, the front output shaft 26 and the front drive shaft 24 are rotating more slowly, the Hall efect sensor 176 provides the signal which is utilized to infer vehicle speed.

The routine 210 then moves to a process step 214 which determines vehicle speed from the signal provided by the Hall effect sensor, either the sensor 170 or the sensor 176 associated with the slower rotating output shaft and drive shaft. Next, the routine 210 moves to a process step 216 which performs a subroutine 240 (illustrated in FIGS. 11a and 11b) which controls the electromagnetic clutch assembly 124. Upon completion of the process step 216, the routine 210 moves to a further process step 218 which executes commands provided by other inputs and routines of the microcontroller 200 for the shift control motor 100. Finally, the routine 210 moves to a fourth process step 220 which disables the on demand system 10 if the selector switch 188 is placed in two-wheel drive. This disable mode is absolute and continues until the selector switch 188 is moved to activate either four-wheel drive high or low on demand operation. Upon completion of the process step 220, the routine 210 returns to the system.

Figure 11B:
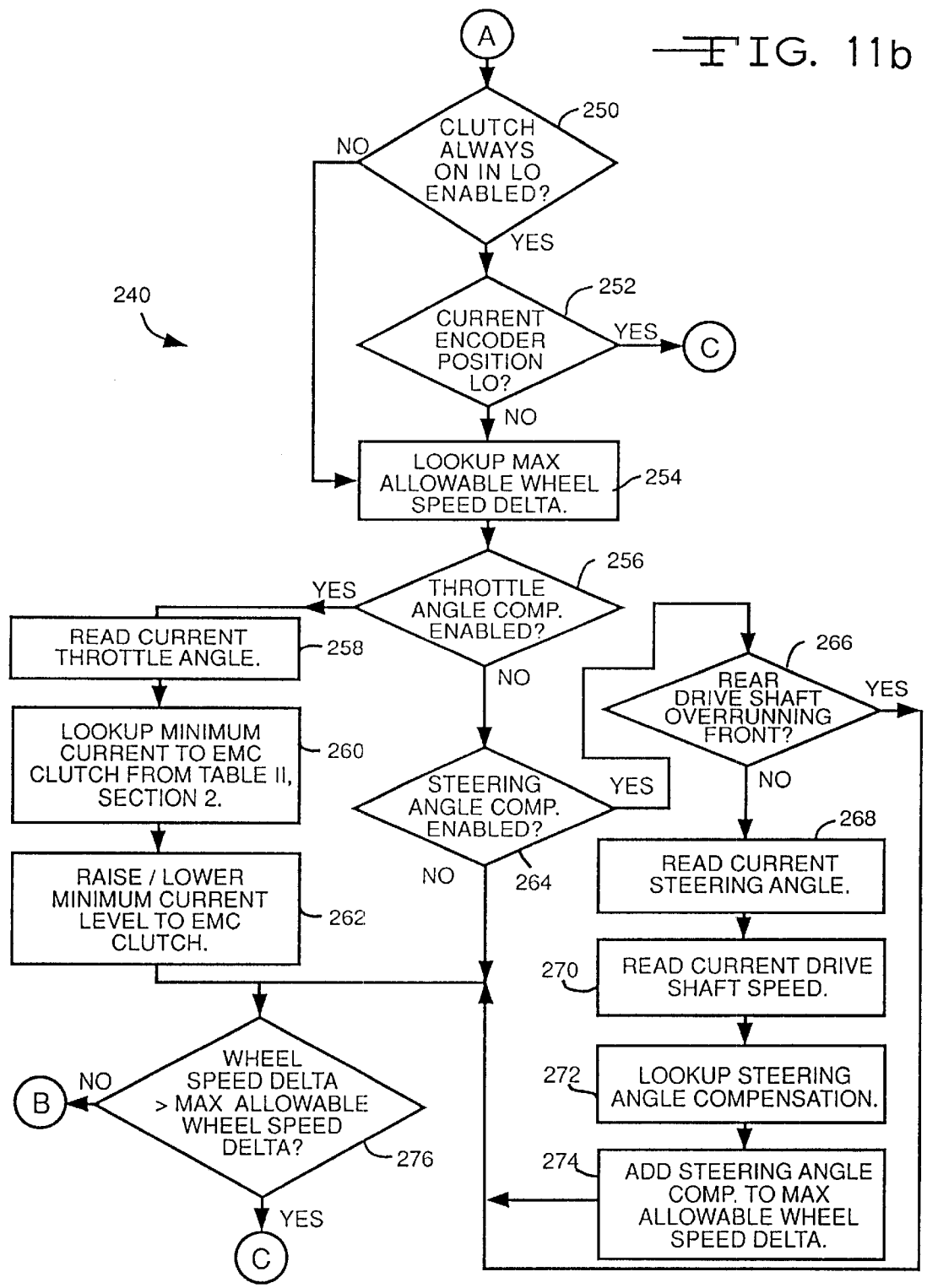
FIG. 11b is a second portion of a flow diagram presenting the operation of the routine of the microcontroller according to the present invention relating to operation of the modulating electromagnetic clutch assembly.

Referring now to FIGS. 11a and 11b, a main clutch control routine 240 begins at a decision point 242 which determines whether the operator selectable switch 188 is positioned in an on demand position. If this is not true, the routine 240 branches at NO to a process step 244 which sets a torque ramp down flag.

If the operator selectable switch 188 is in an on demand position, the decision point 242 is exited at YES and enters a decision point 246 which determines whether the initial power on delay has been completed. If it has not been completed, the decision point 246 is exited at NO and the process step 244 is entered which sets the torque ramp down flag. The power on delay is typically one second. If the power on delay has been completed, the decision point 246 is exited at YES and the routine 240 enters a decision point 248 which interrogates the encoder assembly 106 to determine the current position of the dog clutch 84. If the current position of the encoder assembly 106 is neutral, the decision point 248 branches at YES and the routine 240 moves to the process step 244 which sets the torque ramp down flag. If the current position of the encoder assembly 106 is neutral indicating that the dog clutch 84 of the transfer case 28 is in neutral, the decision point 248 is exited at NO.

Referring now to FIG. 11b, the routine 240 enters a decision point 250 which interrogates the software or a settable memory device of the microcontroller 200 to determine whether a feature which fully engages the electromagnetic clutch assembly 124 in the low gear range of the transfer case 28 is enabled. If it is, the decision point 250 is exited at YES and the routine 240 enters a decision point 252 which determines whether the current position of the encoder assembly 106 and associated components of the transfer case 28 is low gear. If the current position of the encoder assembly 106 is not low gear, the routine 240 branches at NO to a process step 254 which determines the maximum allowable wheel speed difference (which is indicative of wheel slip) for the present vehicle speed inferred from the speed of the drive shaft which is rotating more slowly, as noted above. If the encoder assembly 106 indicates that the associated components of the transfer case 28 are in low gear, the routine branches at YES and moves to a process step illustrated in FIG. 11a. The process step 254 may also be reached by a NO response from the decision point 250 which has determined that the software or memory is set to not enable the electromagnetic clutch assembly 124 in low gear.

The maximum allowable wheel speed difference for a given vehicle speed (which is indicative of wheel slip) is determined from that part, i.e., Part A, B. C or D of Section 1 of Table II which corresponds to the then current operating conditions of the vehicle, i.e., whether the brake switch 190 is activated and whether the transfer case 28 is in high gear or low gear.

The routine 240 then enters a decision point 256 which determines whether throttle angle compensation is enabled, that is, whether the throttle angle sensor 184 and the associated software are functioning. If the throttle angle compensation is enabled, the subroutine 240 branches at YES and enters a process step 258 which reads the current position of the throttle angle sensor 184. The throttle angle sensor 184, as noted, may be either an analog device or may provide signals indicating, for example, specific ranges of positions such as idle to less than 25%, 25% to less than 50%, 50% to less than 75% and 75% and above. With this current data, the subroutine 240 moves to a process step 260 which performs a lookup in Table II, Section 2 to determine the appropriate minimum current to be provided to the electromagnetic clutch assembly 124 in accordance with the present (instantaneous) position of the throttle sensor 184. Next, the routine 240 enters a process step 262 which increases or decreases the PWM duty cycle to raise or lower the minimum current level supplied to the electromagnetic clutch assembly 124 in accordance with the value located in Section 2 of Table II corresponding to the present position of the throttle.

Returning to decision point 256, if the throttle angle compensation is not enabled in the software and in the system 10, the routine 240 branches from the decision point 256 at NO and moves to a decision point 264 which determines whether the steering angle compensation is enabled in the software and in the system 10. If is is not, the subroutine 240 exits the decision point 264 at NO and merges with the output of the process step 262. If the steering angle compensation of the system 10 is enabled, the routine 240 exits the decision point 264 at YES and enters a decision point 266 which determines whether the rear (primary) drive shaft 38 of the vehicle is overrunning the front (secondary) drive shaft 24 which indicates, of course, that the rear tire and wheel assemblies 34 are overrunning the front tire and wheel assemblies 22. If the answer is affirmative, the decision point 266 is exited at YES and the routine 240 joins the output of the process step 262 and the NO exit of the decision point 264. If the rear drive shaft 38 is not overrunning the front drive shaft 24, the decision point 266 is exited at NO and the routine 240 enters a process step 268 which reads the current steering angle.

As noted previously, the steering angle refers to the angle of the steering wheel and is broken down into three ranges: zero to less than plus or minus $15_E$ of steering wheel rotation, that is, zero to less than $15_E$ of rotation either right or left; plus or minus $15_E$ to plus or minus less than $30_E$, that is, between either $15_E$ and less than $30_E$ of left or right rotation of the steering wheel and plus or minus $30_E$ or greater, that is, more than $30_E$ of steering wheel rotation in either the left or right direction. Next, the routine 240 moves to a process step 270 which reads the current speed of the drive shaft 38. The routine 240 then enters a process step 272 which looks up, in Table II, Section 3, the compensation which will adjust the maximum allowable prop shaft speed difference in light of the current steering angle position read in the process step 268 and the speed of the output shaft 40 read in the process step 270. In the following process step 274, the compensation value corresponding to the sensed steering angle is added to the maximum allowable drive shaft speed difference. The routine 240 then enters the decision point 276 which determines whether the speed difference between the drive shafts exceeds the maximum allowable drive shaft speed difference determined by the various steps of the routine 240 discussed directly above. The decision point 276 determines which is the faster rotating drive shaft and also the difference between the speeds of rotation of the rear drive shaft 38 and the front drive shaft 24.

Referring now to FIGS. 11a and 11b, if the drive shaft speed and thus wheel speed difference is less than the maximum allowable difference presented in Table II for the specific vehicle speed and other conditions such as whether the brakes are applied or not and whether the encoder assembly 106 and associated components are in either the low or high speed range, the decision point 276 is exited at NO and the routine 240 returns to the process step 244 which sets a torque ramp down flag. If the speed difference is greater than the allowable speed difference for the then prevailing sensed operational conditions, the decision point 276 is exited at YES and the routine 240 returns to a process step 278 which sets a torque ramp up flag. From both the process steps 244 and 278, the routine 240 moves to a process step 280 which performs control of the hub 16 or analogous structures such as axle disconnect.

The following Table II is a six part look up table utilized by the on demand system 10. Section 1 of Table II presents actual values of wheel speed difference thresholds below which the system 10 does not take action to correct for wheel slip and above which the system begins to correct for wheel slip. The threshold of activation depends upon the vehicle speed in certain modes, whether the brake is applied, whether the encoder assembly 106 and associated components of the transfer case 28 are in high or low gear and whether and by how much the front tire and wheel assemblies 22 and the front drive shaft 24 is overrunning the rear tire and wheel assemblies 34 and the rear drive shaft 38 and vice versa.

Part A of Section 1 of Table II presents threshold front and rear overrun values for incremental engagement of the electromagnetic clutch assembly 124 in the high (direct drive) range of the planetary gear assembly 48 with the vehicle brakes off. Part B of Section 1 of Table II is not vehicle speed dependent and presents threshold values for incremental engagement of the electromagnetic clutch assembly 124 in high range with the vehicle brakes applied. Part C and Part D of Section 1 of Table II present the threshold values of clutch engagement of front and rear speed overrun when the planetary gear assembly 48 is in low range, with the vehicle brakes off and applied, respectively. As noted previously, the on demand system 10 described herein functions with vehicles utilizing their rear wheels as the primary drive wheels and their front wheels as secondary drive wheels or vice versa.

Section 2 of Table II presents throttle angle compensation data which affects the minimum (standby) current to the coil 144 of the electromagnetic clutch assembly 124 when the throttle angle compensation feature is enabled at the process step 256 of the routine 240. Section 3 of Table II presents steering angle compensation values which are added to those values appearing in the Front Overrun column of Section 1 if the steering angle compensation feature is enabled at the process step 264 of the routine 240. The values presented may be interpolated between steering angle positions of zero and $15_E$ and $15_E$ and $30_E$. For example, the correction at zero Kilometers/Hr. vehicle speed and $7.5_E$ steering angle may be interpolated as 1.0 Kilometers/Hr. additional allowed front overrun. Alternatively, the compensation values presented may be used at the steering angles recited and at greater steering angles less than the next higher recited steering angle.

Because vehicle speeds, wheel speed and wheel slip commonly relate to actual performance of a vehicle, they are presented in Table II in units of Kilometers/Hr. On the other hand, the Hall effect sensors 170 and 176 sense rotational speeds of the associated shafts 40 and 26, respectively, and the drive shafts 38 and 24, respectively, coupled thereto in revolutions per minute. These two measurement schemes are, of course, related by the intervening gear ratios of, for example, the rear differential 36, the front differential 14 and such factors as the diameter of the tire and wheel assemblies 22 and 34. It will be appreciated that any shaft speed or wheel speed (and thus vehicle speed) may be readily converted to the other by knowledge and use of the appropriate numerical factor in the microcontroller 200. Such numerical factors will vary from application to application.

TABLE II

SECTION 1

| Vehicle Speed Kilometers/Hr. | Front Overrun Kilometers/Hr. | Rear Overrun Kilometers/Hr. |
|---|---|---|
| PART A-HIGH RANGE-BRAKES OFF | | |
| 0 | 4.5 | 0.5 |
| 4 | 4.5 | 0.5 |
| 8 | 4.5 | 0.5 |
| 12 | 4.5 | 0.5 |
| 16 | 4.5 | 0.5 |
| 20 | 4.5 | 0.5 |
| 24 | 4.5 | 0.5 |
| 28 | 4.5 | 0.5 |
| 32 | 4.5 | 1.0 |
| 36 | 4.5 | 1.0 |
| 40 | 4.5 | 1.0 |
| 44 | 4.5 | 1.5 |
| 48 | 4.5 | 1.5 |
| 52 | 4.5 | 1.5 |
| 56 | 4.5 | 2.0 |
| 60 | 4.5 | 2.0 |
| 64 and above | 4.5 | 3.5 |
| PART B-HIGH RANGE-BRAKES ON | | |
| ALL SPEEDS | 10.0 | 10.0 |
| PART C-LOW RANGE-BRAKES OFF | | |
| ALL SPEEDS | 4.0 | .5 |
| PART D-LOW RANGE-BRAKES ON | | |
| ALL SPEEDS | 6.0 | 6.0 |

SECTION 2
THROTTLE ANGLE COMPENSATION

| Throttle Position | Min. Current to Clutch 124 |
|---|---|
| Idle to <25% | 8% |
| 25% to <50% | 16% |
| 50% to <75% | 30% |
| 75% and above | 60% |

SECTION 3
STEERING ANGLE COMPENSATION

| Vehicle Speed Kilometers/Hr. | Steering Angle $0_E$ | $\forall 15_E$ | $\forall 30_E$ and up |
|---|---|---|---|
| 0 | 0 | 2.0 | 4.0 |
| 4 | 0 | 2.0 | 4.0 |
| 8 | 0 | 2.0 | 4.0 |
| 12 | 0 | 2.0 | 4.0 |
| 16 | 0 | 2.0 | 4.0 |
| 20 | 0 | 2.0 | 4.0 |
| 24 | 0 | 2.0 | 4.0 |
| 28 | 0 | 2.0 | 4.0 |
| 32 | 0 | 1.5 | 3.5 |
| 36 | 0 | 1.5 | 3.5 |
| 40 | 0 | 1.5 | 3.5 |
| 44 | 0 | 1.5 | 3.5 |
| 48 | 0 | 1.0 | 3.0 |
| 52 | 0 | 1.0 | 3.0 |
| 56 | 0 | 1.0 | 3.0 |
| 60 | 0 | 0.0 | 2.5 |
| 64 and above | 0 | 0.0 | 2.5 |

Reference to Table II clarifies that speed differences which activate the electromagnetic clutch assembly 124 relate only to the speed of one drive shaft which is rotating more rapidly than, that is, overrunning, the other drive shaft. Accordingly, Table II, above, applies to both front and rear primary drive vehicles.

Figure 12:
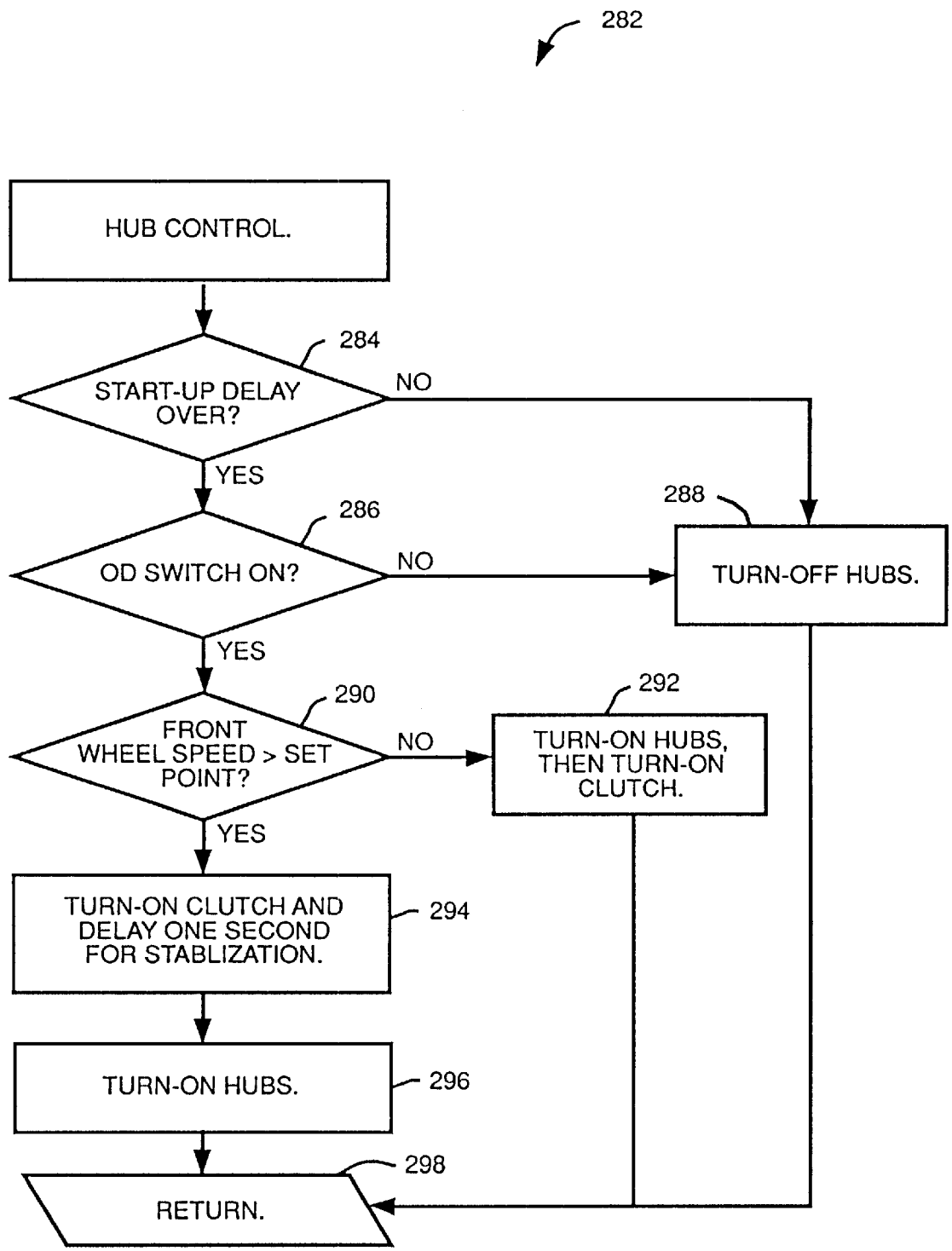
FIG. 12 is a flow diagram presenting the operation of the subroutine of the microcontroller according to the present invention relating to control of locking hubs.

Referring now to FIG. 12, a hub control subroutine 282 commences at a decision point 284 which again checks to see if the one second startup delay has been completed. If it has, the decision point 284 is exited at YES and the subroutine 282 moves to a decision point 286 which checks to determine if the operator selectable switch 188 is still in an on demand position. If it is not, the decision point 286 is exited at NO and the subroutine 282 moves to a process step 288 which de-energizes the locking hubs 16 or other analogous structure such as an axle disconnect. The process step 288 is also reached if it is determined at the decision point 284 that the startup delay has not been completed. The subroutine 282 then exits the process step 288 and returns to the routine 240 illustrated in FIG. 11a, at the process step 280.

Continuing with the hub control subroutine 282, if the interrogation of the operator selectable switch 188 in the decision point 286 determines that it is still in an on demand position, the decision point 286 is exited at YES and the subroutine 282 moves to a decision point 290 which interrogates the front (secondary) wheel speed sensor 180 to determine whether the speed of rotation of the associated front tire and wheel assembly 22 is greater than a set point speed. Typically, the set point speed will be about 2 kilometers per hour. If the front (secondary) wheel speed is less this the set point, indicating that the vehicle may be either stationary and thus stuck or moving at a very low speed relative to the speed of the rear (primary) drive shaft 38 and the associated rear tire and wheel assemblies 34, the subroutine 282 exits the decision point 290 at NO and enters a process step 292 which first activates the locking hubs 16 or analogous axle disconnect means and, after a short delay, activates the electromagnetic clutch assembly 124. Such staged or sequential activation of first the locking hubs 16 and then the electromagnetic clutch assembly 124 minimizes engagement shock on the locking hubs 16. If the front wheel speed sensor 180 indicates that the speed of the associated front tire and wheel assembly 22 is above the set point, the decision point 290 is exited at YES and the subroutine 282 enters a process step 294 which first activates the electromagnetic clutch assembly 124 and pauses for one second to allow stabilization of the clutch assembly 124 and associated components of the power train. Then, the subroutine 282 moves to a process step 296 which activates the locking hubs 16 or analogous means such as an axle disconnect. After turning on the locking hubs 16, the subroutine 282 returns to the routine 240, illustrated in FIG. 11a, at the process step 280.

The clutch routine 240 then enters a process step 300 which is capable of increasing the duty cycle of the PWM signal and thus the average electrical current provided to the electromagnetic clutch assembly 124 and the coupling provided between the rear (primary) output shaft 40 and the front (secondary) output shaft 22.

Figure 13:
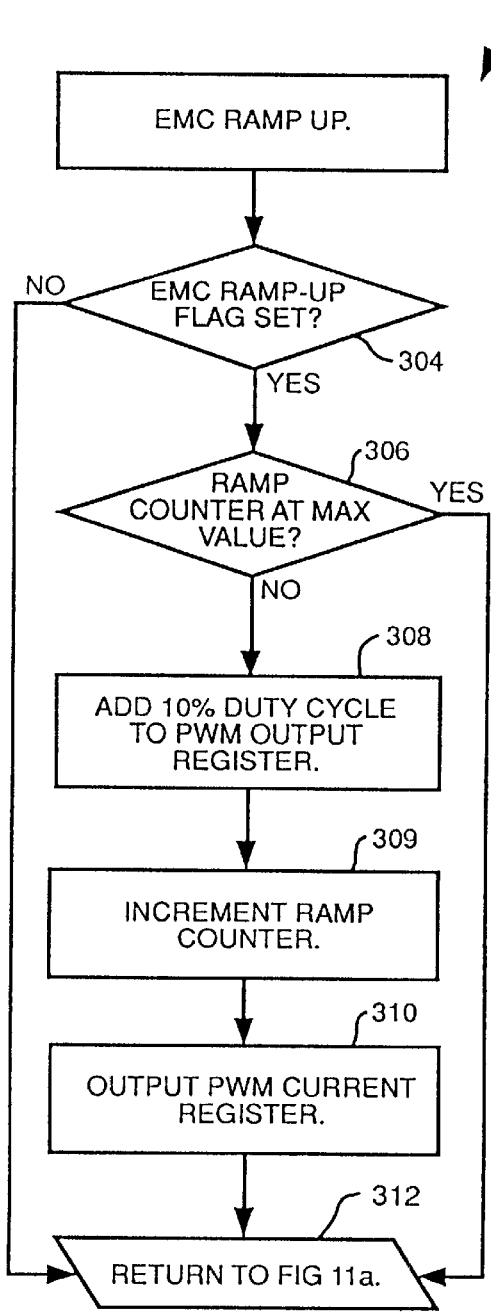
FIG. 13 is a flow diagram presenting the operation of the subroutine of the microcontroller according to the present invention relating to incrementing power to the electromagnetic clutch assembly.

The process step 300 comprehends a subroutine 302 relating to ramping up of the electromagnetic clutch assembly 124. The ramp up subroutine 302 appears in FIG. 13 and begins at a decision point 304 where the subroutine determines whether a clutch ramp up flag has been previously set in the clutch routine 240. If it has not been set, the decision point 304 is exited at NO and the subroutine 302 returns to the clutch routine 240 at the process step 300 illustrated in FIG. 11a. If a clutch ramp up flag has been set, the subroutine 302 exits the decision point 304 at YES and enters a decision point 306 which determines whether a ramp increment counter is at a maximum value and thus that the output power to the electromagnetic clutch 124 is also at a maximum.

Typically, the PWM signal to the electromagnetic clutch assembly 124 will be incremented in eight, ten or twelve steps and the current step will be recorded in a ramp counter. The use of ten (10) steps or increments is presently preferred. Since the nominal range of current to the coil 144 of the electromagnetic clutch assembly 124 is from 8% to 88%, i.e., a difference of 80%, each of the ten 10% increments or steps represent an increase or decrease in clutch current of 8%. If the ramp counter is at its maximum value, the decision point 306 is exited at YES and the subroutine 302 returns to the process step 300 of the clutch routine 240. If the ramp counter is not at a maximum value the subroutine branches at NO and enters a process step 308 which increments an additional ten percent duty cycle to the value currently in the PWM output register and then enters a process step 309 which increments the ramp counter by one count. The subroutine 302 then moves to a process step 310 which outputs the new duty cycle (current level) in the register which establishes the PWM signal to a drive circuit which provides electrical energy to the coil 148 of the electromagnetic clutch assembly 124. The subroutine 302 then returns to the clutch routine 240 at process step 300 and the routine 240 enters a process step 312 to perform the converse operation.

Figure 14:
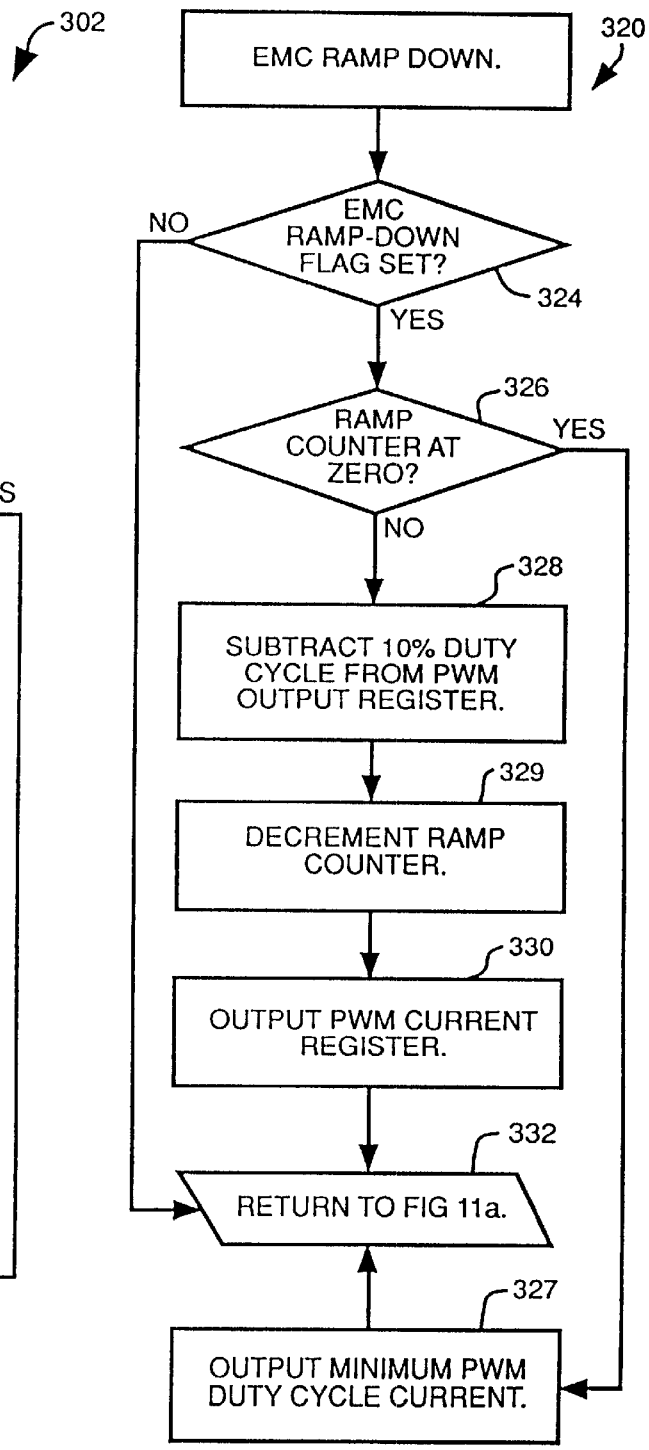
FIG. 14 is a flow diagram presenting the operation of the subroutine of the microcontroller according to the present invention relating to decrementing power to the electromagnetic clutch assembly.

The ramping down of the electromagnetic clutch assembly 124 is achieved by a ramp down subroutine 320 which appears in FIG. 14. The ramp down subroutine 320 begins at a decision point 324 in which the subroutine 320 determines whether a clutch ramp down flag has been previously set in the clutch control routine 240. If it has not been set, the decision point 324 is exited at NO and the subroutine 320 returns to the clutch control routine 240 at the process step 312 illustrated in FIG. 11a. If a clutch ramp down flag has been set, the subroutine 320 exits the decision point 324 at YES and enters a decision point 326 which determines whether the output to the electromagnetic clutch assembly 124 is at minimum as determined by the ramp increment counter. If the counter is at zero, the decision point 326 is exited at YES and the subroutine 320 enters a process step 327 which instructs the drive circuits to provide the minimum (8%) duty cycle current to the electromagnetic clutch assembly 124 to maintain all associated driveline components in a ready or standby condition. If the ramp counter is not at zero, the subroutine branches at NO and enters a process step 328 which decrements ten percent from the duty cycle value currently in the output current register. The subroutine 320 then moves to a process step 329 which decrements the ramp counter by one count then to a process step 320 which outputs the new current level in the register which establishes the PWM signal to a drive circuit which provides electrical energy to the coil 148 of the electromagnetic clutch assembly 124. The subroutine 320 then returns to the clutch routine 240 at the process step 312.

Upon return to the process step 312, the clutch control routine 240 has been completed as well and the routine 240 returns to the process step 216 of the routine 210 of LOOP2 illustrated in FIG. 10.

A typical operating cycle of the electromagnetic clutch assembly 124 is illustrated in FIG. 8. As noted, when the on demand system 10 is activated, the PWM signal initializes and holds at a minimum current of eight percent, i.e., eight percent duty cycle of the PWM signal. The solid stairstep lines of FIG. 8 illustrate a condition of substantially instantaneous drive shaft speed difference and thus wheel slip in excess of the values of Table II. Accordingly, the PWM signal to the coil 148 of the electromagnetic clutch assembly 124 is increased in ten percent steps every 30 milliseconds up to the maximum clutch current of approximately eighty-eight percent. When the drive shaft speed difference falls below the appropriate value appearing in Table II, the PWM current to the coil 148 is decremented in ten percent steps and returns to the minimum (standby) eight percent current level. The solid, irregular line of FIG. 8 illustrates a more common condition in which incrementing and decrementing the clutch current and providing corresponding torque transfer through the electromagnetic clutch assembly 124, upon sensing drive shaft speed differences and thus wheel slip according to Table II, temporarily eliminates such slip. When a speed difference indicating wheel slip is again sensed, current to the electromagnetic clutch assembly 124 is again incremented. This plot represents typical operation of the system 10 as it monitors and rapidly responds to changing conditions.

Figure 15:
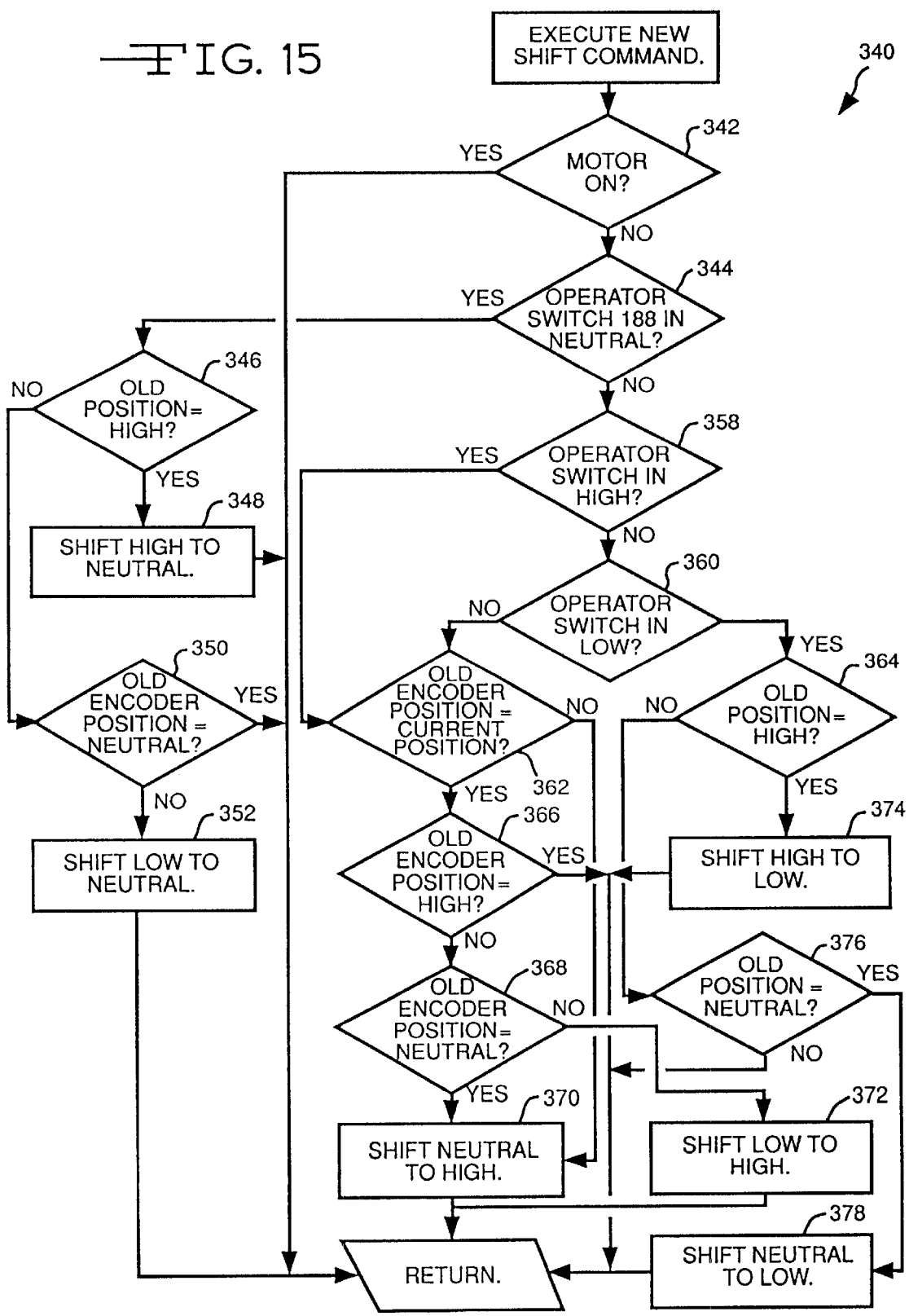
FIG. 15 is a flow diagram presenting the operation of the subroutine of the microcontroller according to the present invention relating to the operator shift commands.

Referring now to FIG. 15, a third program appearing in LOOP2 is a routine 340 relating to the operator shift commands. The operator shift command routine 340 begins at a decision point 342 which interrogates the drive to the shift control motor 100. If such drive is active, the routine branches at YES and returns to the system. If the shift control motor 100 is not operating, the routine branches at NO and moves to a decision point 344 which determines whether the neutral position on the operator selectable switch 188 has been selected. If it has, the routine branches at YES and enters a decision point 346. The decision point 346 determines if the old position of the selector switch 188 was high gear. If it was, the routine 340 branches at YES and moves to a process step 348 which commands a shift from high gear to neutral and then returns to the system. If the answer at the decision point 346 is in the negative, the routine 340 branches at NO and enters a decision point 350 which determines whether the old position of the selector switch 188 was neutral. If it was, the routine 340 branches at YES and returns to the system. If it was not, the routine branches at NO and moves to a process step 352 which commands a shift from low gear to neutral. The routine 340 then returns to the system.

Returning to the decision point 344, if the neutral position of the switch 188 is not active, the routine 340 branches at NO and reaches a decision point 358 which determines whether the switch 188 is in high gear position. If the four-wheel drive high position of the selector switch 188 is not active, the routine 340 branches at NO and moves to a decision point 360. If it is, the routine branches at YES and moves to a decision point 362. The decision point 360 determines whether the switch 188 is in the low gear position. If it is, the routine 340 branches at YES and moves to a decision point 364.

Continuing with the routine 340 at the decision point 362, a checking step determines if the previously commanded, i.e., old, position of the switch 188 and shift control motor 100 is the current position. If it is, the routine branches at YES and moves to a decision point 366 which determines if the old position was high gear. If it was, the routine 340 branches at YES, takes no further action and returns to the system. If the old position was not high gear, the routine branches at NO and moves to a decision point 368 which determines whether the old position of the switch 188 and the shift control motor 100 was neutral. If it was, the routine 340 branches at YES and enters a process step 370 which commands a shift of the shift control motor 100 and associated components from neutral to high gear and then returns to the system. Alternatively, if it is determined that the old position of the switch 188 and shift control motor 100 was not neutral, the routine branches at NO and moves to a process step 372 which commands a shift of the shift control motor 100 and associated components from low gear to high gear and then returns to the system.

Continuing with the shift command routine 340 at the decision point 364, if the old position of the selector switch 188 and the shift motor 100 was high gear, the routine branches at YES and moves to a process step 374 which commands a shift from high gear to low gear and then returns to the system. If the old position was not high gear, the decision point 364 branches at NO and enters a decision point 376 which determines whether the old position of the selector switch 188 and shift control motor 100 was neutral. If it was, the routine branches at YES and moves to a process step 378 which commands a shift of the shift control motor 100 and associated components from neutral to low gear and then returns to the system. If the old position was neutral, the decision point 376 is exited at NO and the routine 340 returns to the system.

Figure 16:
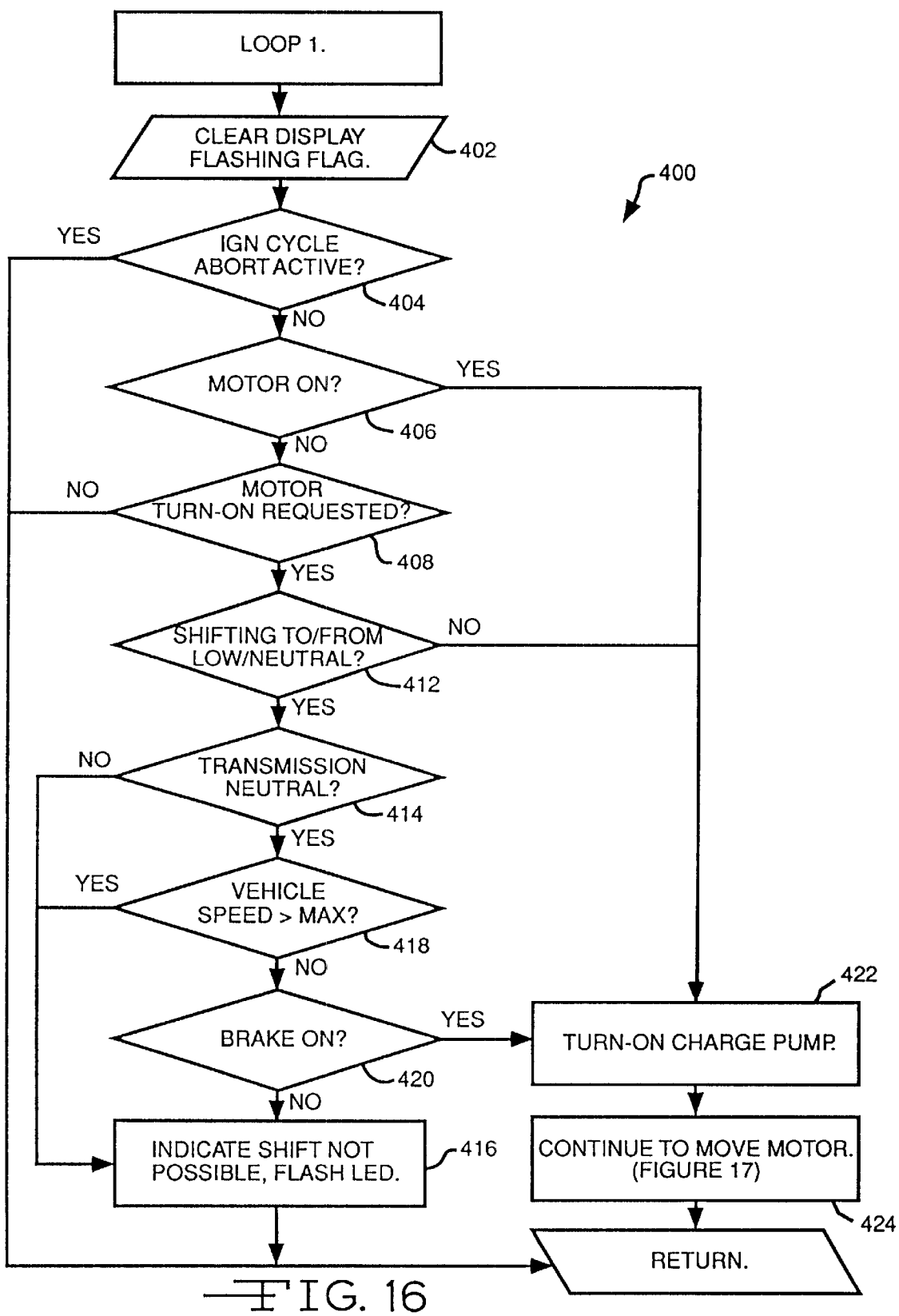
FIG. 16 is a flow diagram presenting the operation of the routine of the microcontroller according to the present invention relating to control of the shift motor.

Referring now to FIG. 16, the routines and subroutines of LOOP1 will now be described. LOOP1 contains those routines and subroutines which require the fastest execution rate and must be updated most frequently in order to provide suitable operation of the on demand system 10. LOOP1 includes a shift motor control routine 400 which accepts driver input commands and monitors all conditions relating to the position of the shift control motor 100. The control motor routine 400 begins at an initialization step 402 which clears any display flashing flags. These flags may result from operator shift command requests that were blocked because the present speed of the vehicle was being too great, the transmission neutral switch 46 indicated that the transmission 44 was not in neutral or that the brake switch 190 indicated that the brakes were not applied. With such flags cleared, the routine 400 proceeds to a decision point 404 which determines if the ignition cycle abort is active. This abort indication will be active if the shift control motor 100 has attempted to reach a newly requested position. The value chosen in the present system 10 is six. Greater or lesser abort cycle thresholds may be utilized, if desired. If the shift control motor 100 has attempted a new shift command in excess of six times, the abort cycle will be active and the vehicle ignition system must be turned off before this counter will be reset to zero.

If the ignition abort cycle is active, the decision point 404 is exited at YES and the routine returns to the system. If the ignition cycle abort is inactive, the routine 400 branches at NO and enters a decision point 406 which enquires whether the shift control motor 100 is presently on or activated. If it is, the decision point 406 is exited at YES and the routine moves to a process step 422. If the control motor 100 is not on, the decision point 406 is exited NO and the routine enters a decision point 408 which determines if there is a present request that the shift control motor 100 be turned on. If there is no such request, the decision point 408 is exited at NO and the shift control motor routine 400 is exited and returns to the system. If there is a shift motor 100 turn on request, the decision point 408 is exited at YES and the routine enters a decision point 412 which determines whether the shift then being executed is to or from four-wheel drive low or neutral. If it is not, the decision point 412 is exited at NO and the routine 400 enters the process step 422. If it is, the decision point 412 is exited at YES and the routine moves to a decision point 414.

Decision point 414 interrogates the transmission neutral switch 46 to determine whether the transmission 44 is in neutral. If it is not, the decision point 414 is exited at NO and the routine enters a process step 416. If the transmission 44 is in neutral, the decision point 414 is exited at YES and the routine 400 moves to a decision point 418 which compares the current vehicle speed with the predetermined maximum speed to determine if it is in excess of the predetermined maximum. If it is, the routine exits at YES and enters the process step 416. It the vehicle speed is below the maximum predetermined value, the decision point 418 is exited at NO and the routine 400 enters a decision point 420 which interrogates the brake switch 190. If the brake switch 190 is off indicating that the brakes are not applied, the decision point 420 is exited at NO and the routine moves to the process step 416. The process step 416 provides signal to one of the dashboard indicator lights 202 that a shift is not possible because either the vehicle transmission 46 is not in neutral, the vehicle speed presently exceeds the predetermined maximum value or the vehicle brakes are not applied.

Returning to the decision point 420, if the vehicle brakes are on, the decision point 420 is exited at YES and the routine enters the process step 422. The process step 422 provides a signal which drives the field effect transistors (FET's) which provide current to the shift control motor 100. The routine 400 then moves from the process step 422 to a process step 424 which continues to drive the shift control motor 100 in accordance with a motor control subroutine 430.

Figure 17:
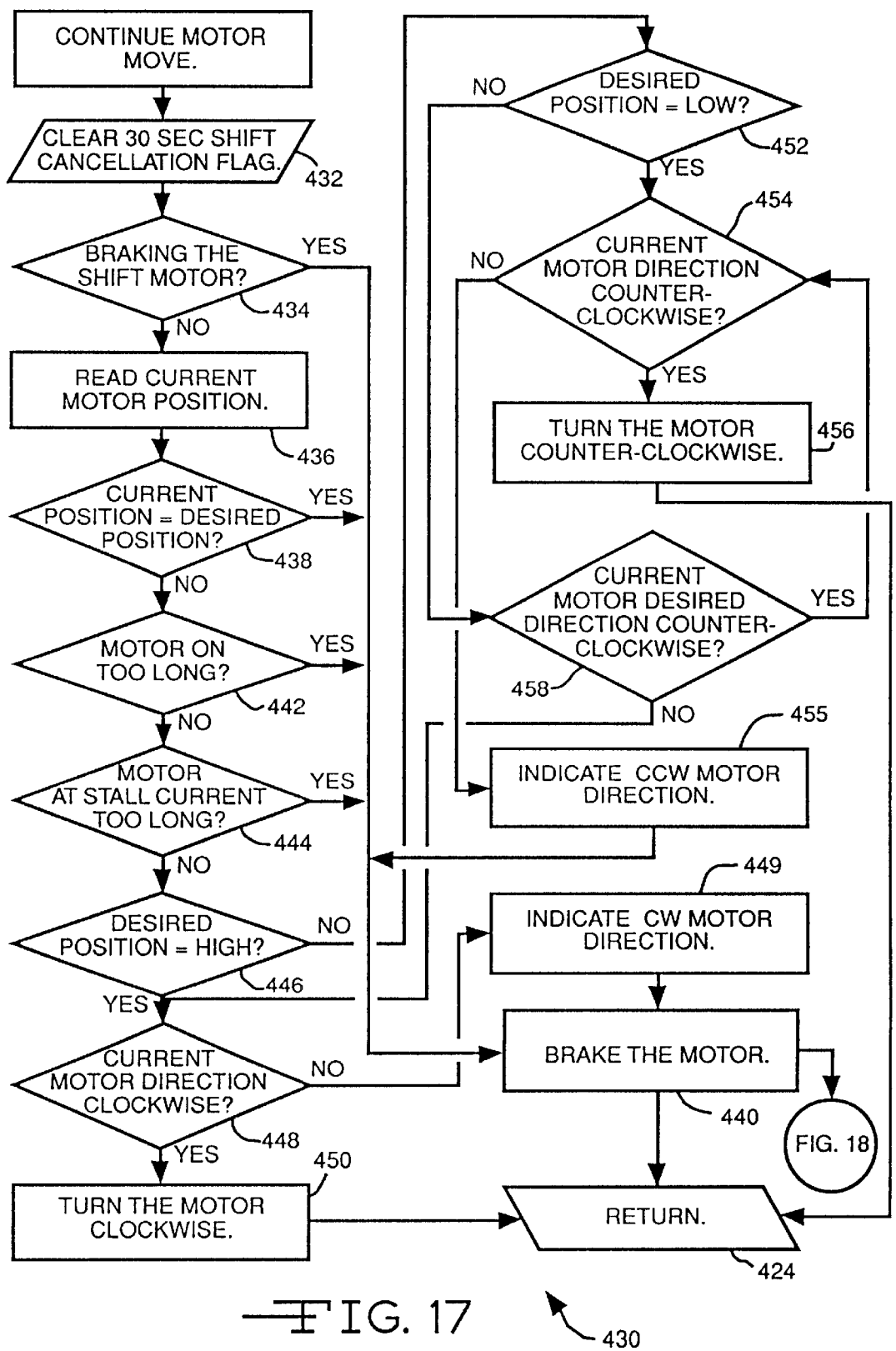
FIG. 17 is a flow diagram presenting the operation of the subroutine of the microcontroller according to the present invention relating to control of the shift motor.

The motor control subroutine 430 is illustrated in FIG. 17. The subroutine 430 is initialized by a step 432 which clears a thirty second shift cancellation flag and moves to a decision point 434 which enquires whether the shift control motor 100 is being braked. If it is, the subroutine branches at YES and enters a process step 440 which incorporates a shift motor braking subroutine which appears in FIG. 18. If the shift motor 100 is not undergoing braking, the decision point 434 is exited at NO and the subroutine enters a process step 436 which reads the current position of the shift control motor 100 indicated by the encoder assembly 106. The subroutine 430 then moves to a decision point 438 which compares the current position of the encoder assembly 106 and associated components to the desired position. If they are the same, the decision point 438 is exited at YES and the program moves to the process step 440 which brakes the shift control motor 100.

If the position of the encoder assembly 106 does not coincide with the desired position thereof, the decision point 438 is exited at NO and the subroutine enters a diagnostic decision point 442 which reads a timer to determine the length of time the shift control motor 100 has been activated. If the shift control motor 100 has been activated and running for a period in excess of a predetermined time period, the decision point 442 is exited at YES and the subroutine 430 enters the process step 440 which brakes the shift control motor 100. If the time the shift control motor 100 has been operating is less than the predetermined time, the decision point 442 is exited at NO and the subroutine moves to a second diagnostic decision point 444 which determines whether the shift control motor 100 has been drawing stall current for a period in excess of a predetermined time period. If it has, the decision point 444 is exited at YES and the process step 440 is entered.

If the shift control motor 100 has not been drawing stall current for a period of time which exceeds a predetermined time period, the decision point 444 is exited at NO and the program enters a decision point 446 which enquires whether the desired position of the encoder assembly 106 and the associated components is high gear. If this is the desired position, the decision point 446 is exited at YES and the subroutine 430 enters a decision point 448. If the desired position is not high gear, the decision point is exited at NO and the subroutine 430 moves to a decision point 452.

The decision point 448 enquires whether the current direction of the shift control motor 100 is clockwise. If it is not, the decision point 448 is exited at NO and the subroutine 400 moves to a process step 449 which established that the desired rotation of the shift control motor 100 is clockwise and then proceeds to the process step 440 which brakes the shift control motor 100. If the current direction of the shift control motor 100 is clockwise, the subroutine exits the decision point 448 at YES and moves to a process step 450 which commands continued clockwise movement of the shift control motor 100. Exiting the process step 450, the subroutine 430 returns to the process step 424 of the routine 400 illustrated in FIG. 16.

Returning now to the decision point 452, this determines if the desired position of the encoder assembly 106 and associated components is low gear. If this is the desired position, the subroutine 430 exits the decision point 452 at YES and enters a decision point 454. If the desired position is not low gear, the decision point 452 is exited at NO and the subroutine 430 moves to a decision point 458.

If the subroutine 430 enters the decision point 454, an interrogation of the present direction of rotation of the shift control motor 100 is performed to determine if it is operating in the counterclockwise direction. If it is not, the decision point 454 is exited at NO and the subroutine 430 enters a process step 455 which indicates that the desired rotation of the shift control motor 100 is counterclockwise and then proceeds to the process step 440 which brakes the shift control motor 100. If the shift control motor 100 is operating in the counterclockwise direction, the decision point 454 is exited at YES and the subroutine moves to the process step 456 which commands the shift control motor 100 to continue to rotate in a counterclockwise direction. Exiting the process step 456, the subroutine 430 returns to the process step 424 of the routine 400 illustrated in FIG. 16. The decision point 458 enquires whether the current desired direction of the shift control motor 100 is counterclockwise. If it is, the decision point 458 is exited at YES and the subroutine returns to the decision point 448. If the desired direction of the shift control motor 100 is not counterclockwise, the decision point 458 is exited at NO and the subroutine returns to the decision point 454.

Figure 18:
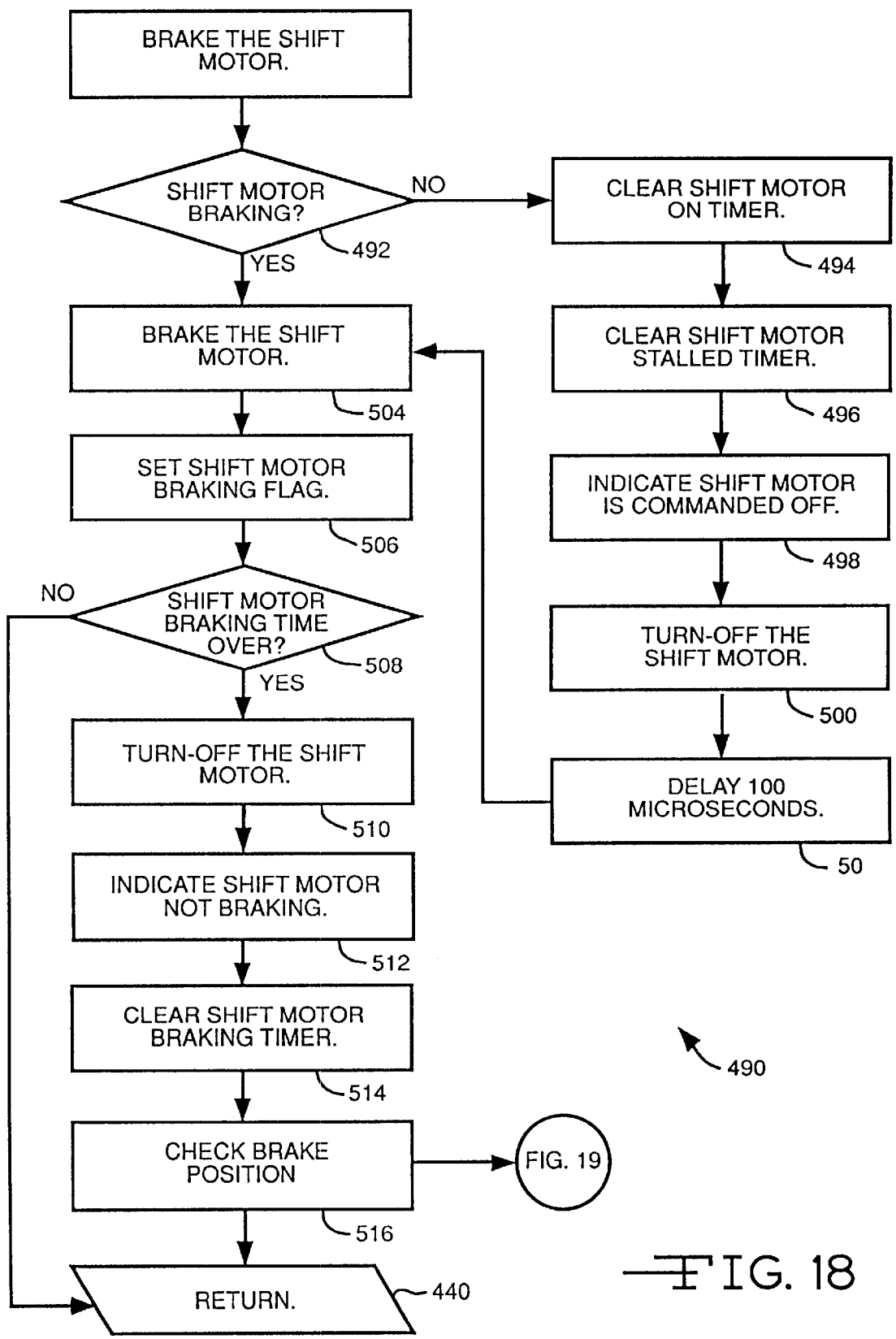
FIG. 18 is a flow diagram presenting the operation of the subroutine of the microcontroller according to the present invention relating to braking of the shift motor.

Referring now to FIG. 18, from the process step 440 of the motor control subroutine 430, a shift motor braking subroutine 490 is commenced at a decision point 492 which determines if the shift control motor 100 is braking. If it is not, the subroutine 490 branches at NO and enters a series of five process steps the first of which, process step 494 clears the motor on time counter which has been totalling the on time of the shift control motor 100 during its current duty cycle. The subroutine 490 then moves to a process step 496 which clears a timer which, if the motor has been stalled, has accumulated the total stall time. Next, a process step 498 is undertaken which indicates that the shift motor 100 has been commanded to turn off. The process step 500 generates a command which terminates electrical energy to the shift control motor 100. The subroutine 490 then enters a process step 502 which times out a one hundred microsecond delay. The series of process steps 494, 496, 498, 500 and 502 is complete when the one hundred microsecond delay has elapsed and the subroutine returns to a process step 504. The process step 504 which generates a command to brake the shift control motor 100 is also entered by a YES response to the enquiry of the decision point 492 regarding braking of the shift control motor 100. The process step 504 generates a command to brake the shift control motor 100.

Figure 19:
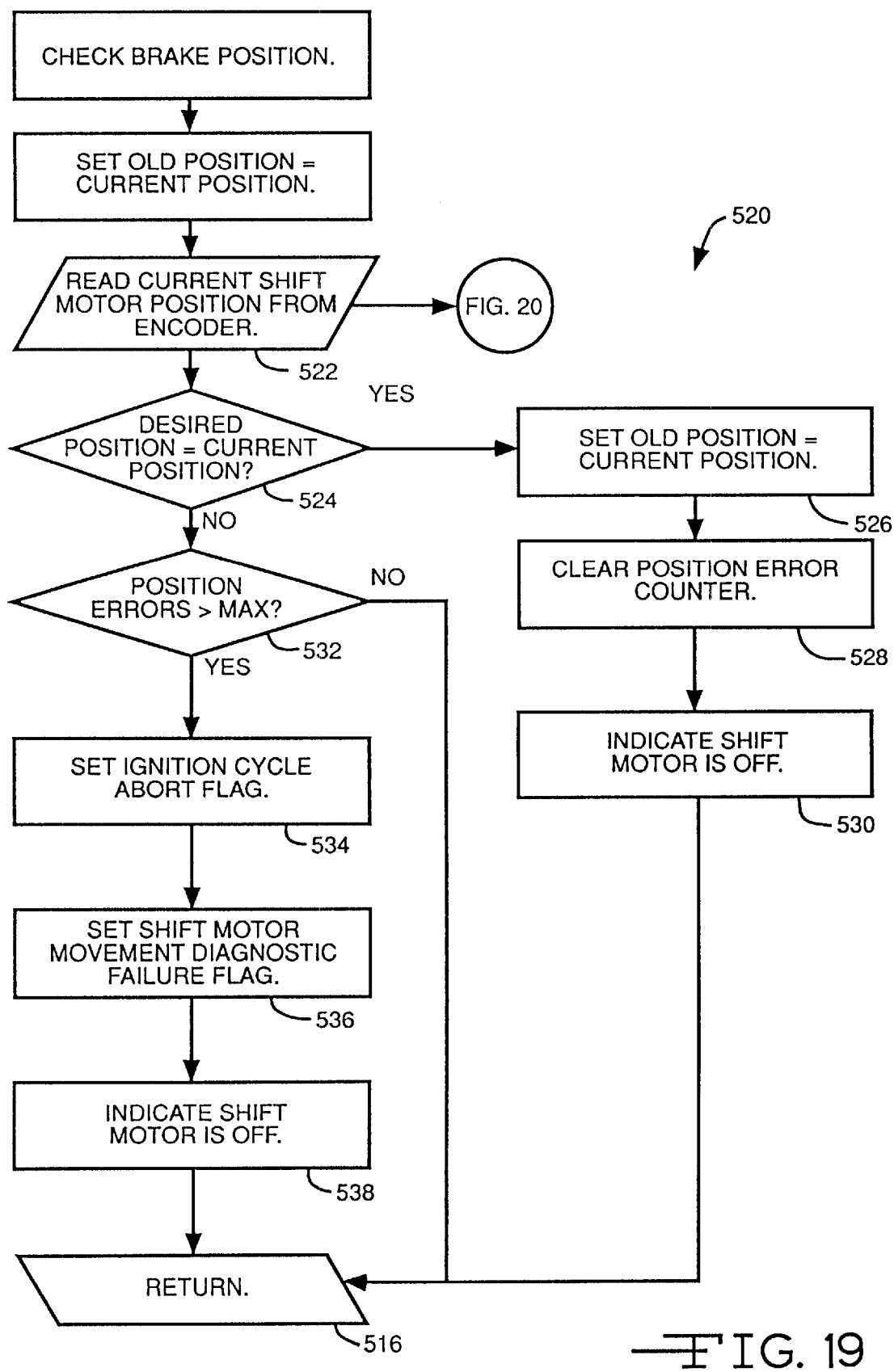
FIG. 19 is a flow diagram presenting the operation of the subroutine of the microcontroller according to the present invention relating to the position of the braked shift motor.

From the process step 504, the shift motor braking subroutine 490 moves to a process step 506 which sets a shift control motor 100 braking flag. The subroutine 490 then enters a decision point 508 which enquires whether the braking time of the shift control motor 100 has elapsed. If the time is has not elapsed, the subroutine branches at NO and returns to the process step 440 of the motor control subroutine 430. If the response is affirmative, the subroutine branches at YES and enters a process step 510 which to the shift control motor 100. The subroutine 490 then enters a process step 512 which provides an indication to associated routines and subroutines that the motor is not braking. Subsequently, the subroutine enters a process step 514 which clears or sets to zero the motor braking timer. Finally, the subroutine 490 enters a process step 516 which checks the position of the brake, branching to another subroutine, the brake motor position subroutine 520 which is illustrated in FIG. 19. When the brake motor position subroutine 520 has been completed, the shift motor braking subroutine 490 returns to the process step 440 of the motor control subroutine 430 which in turn returns to the shift motor control routine 400 at the process step 424.

Figure 20:
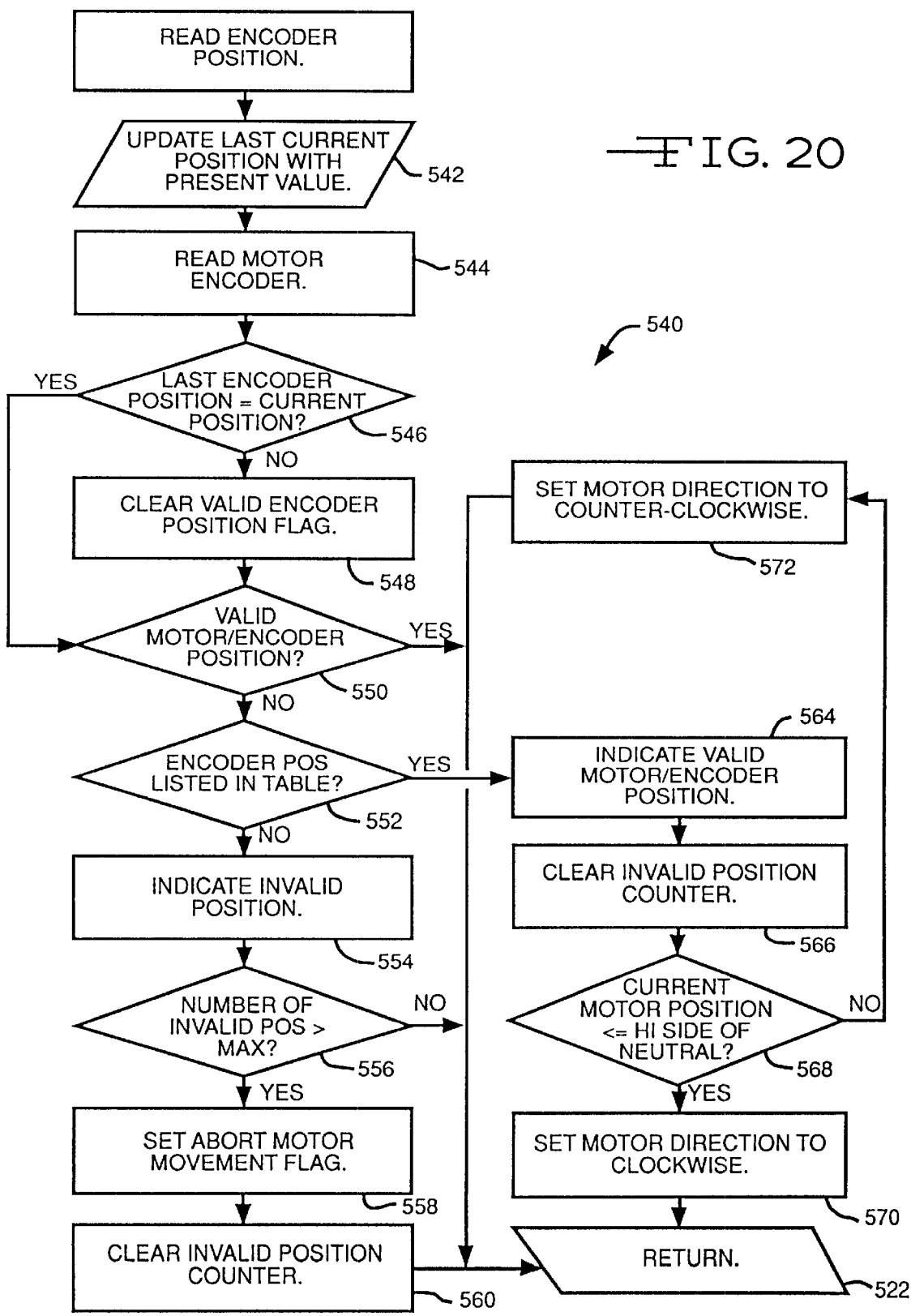
FIG. 20 is a flow diagram presenting the operation of the subroutine of the microcontroller according to the present invention relating to the position of the shift motor.

Referring now to FIG. 19, the brake motor position subroutine 520 begins with an initializing step 522 which reads the current position of the encoder assembly 106 from a motor position read subroutine 540 which is illustrated in FIG. 20 and will be discussed subsequently. Supplied with current information regarding the position of the encoder assembly 106 and thus of the position of the associated components, the subroutine 520 enters a decision point 524 which compares the data from the motor position read routine 540 and the encoder assembly 106 with the position selected by the selector switch 188. If the positions are the same, the subroutine 520 branches at YES and enters a series of process steps commencing with a process step 526 which functions as an update operation and sets the old position of the encoder assembly 106 in memory as the current position. The process step 528 is then entered which clears a position error counter that is, resets it to zero. Finally, the subroutine 520 enters a process step 530 which provides an indication to other subroutines of the microcontroller 200 that the shift control motor 100 is de-energized. The subroutine 520 then returns to the process step 516 of the shift motor braking subroutine 490.

Returning to the decision point 524, if the desired position and current position of the encoder assembly 106 differ, the decision point 524 is exited at NO and the subroutine 520 enters a decision point 532 which interrogates a position error counter to determine whether the errors in the position exceed a maximum preset number. In the present system 10, this value has been set at six. If this value has been exceeded, the program branches at YES and enters process step 534 which sets the ignition cycle abort flag. As noted previously, this abort flag provides an indication on one of the dashboard indicator lights 202 and inhibits further activity of the on demand system 10 until the ignition switch has been reset, i.e., turned off and then turned on. If the number of position errors is fewer than the maximum, the decision point 532 branches at NO and returns to the shift motor braking subroutine 490 at the process step 516.

When the ignition cycle abort flag has been set in the process step 534, the subroutine 520 moves to a second process step 536 which sets a motor movement diagnostic failure flag. Then, the subroutine 520 moves to a final process step 538 which provides an indication to other subroutines as necessary, that the shift control motor 100 is not operating. The brake motor position subroutine 520 then returns to the shift motor braking subroutine 490 at the process step 516.

Referring now to FIG. 20, a final subroutine 540 which reads the position of the shift control motor 100 by reading information provided from the encoder assembly 106 will be described. The motor position read subroutine 540 begins at an initializing step 542 which updates the last current position provided by the encoder assembly 106 with the present value provided by the encoder assembly 106. The subroutine 540 moves to a process step 544 which interrogates the encoder assembly 106 and receives information therefrom regarding its current position. The subroutine 540 then enters a decision point 546 which compares the previous position of the encoder assembly 106 with the most recently read position. If they are the same, the subroutine 540 branches at YES and enters a decision point 550. If the last position of the encoder assembly 106 and the currently read position are not the same, the subroutine 540 branches at NO, enters a process step 548 which clears a previously set valid encoder position flag and then proceeds to the decision point 550.

At the decision point 550, a determination is made whether the indicated positions of the shift control motor 100 and encoder assembly 106 are valid. If they are, the program branches at YES and returns to the brake motor position subroutine 520 at the initializing step 522. If the positions of the shift control motor 100 and encoder assembly 106 are not valid the subroutine 540 branches at NO and enters a decision point 552. The decision point 552 checks the current position of the encoder assembly 106 against the known and accepted values it provides which appear in Table I. If the position is not listed in Table I, the decision point 552 is exited at NO and the subroutine 540 enters a process step 554 which sets an indication of an invalid position of the encoder assembly 106. The subroutine 540 then enters a decision point 556 which compares the number of invalid positions reached during this operating cycle with a maximum value stored in memory. If the maximum value has not been exceeded, the subroutine 540 branches at NO and returns to the brake motor position subroutine 520 at the initializing step 522. If the maximum number of invalid positions has been exceeded, the subroutine 540 branches at YES and enters a process step 558 which sets an abort motor movement flag. Finally, a process step 560 is undertaken which generates a command to clear the invalid position counter, that is, to reset it to zero. Subsequent to the process step 560, the motor position read subroutine 540 returns to the brake motor position subroutine 520 at the initializing step 522.

Returning to the decision point 552, if the position of the encoder assembly 106 is listed in Table I, the decision point 552 is exited at YES and enters a process step 564 which generates an indication that the position of the encoder assembly 106 and the shift control motor 100 is valid. The subroutine 540 then goes to a second process step 566 which clears, that is, resets to zero the invalid encoder assembly 106 position counter. Next, the subroutine 540 enters a decision point 568 which determines if the encoder assembly 106 indicates that the current position of the shift control motor 100 is less than or in the neutral position. If the response is affirmative, the subroutine 540 branches at YES and enters a process step 570 which sets the direction of the shift control motor 100 to clockwise. If the answer is negative, the subroutine 540 branches at NO and enters a process step 572 which commands the direction of the shift control motor 100 to be counterclockwise. In either case, the motor position subroutine 540 is complete and the subroutine 540 returns to the brake motor position subroutine 520 at the initializing step 522.

The foregoing disclosure is the best mode devised by the inventors for practicing this invention. It is apparent, however, that apparatus incorporating modifications and variations will be obvious to one skilled in the art of four-wheel drive systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An adaptive four-wheel vehicle drive system comprising, in combination, a primary drive assembly including a primary differential, primary axles and primary drive wheels, a secondary drive assembly including a secondary differential, secondary axles and secondary drive wheels, a transmission for providing torque to said primary drive assembly, an electromagnetic modulating clutch for selectively transferring torque from said primary drive assembly to said secondary drive assembly, said electromagnetic modulating clutch including a disc pack assembly, an electromagnetic coil, and an operator including at least one cam surface operable to compress said disc pack assembly, at least one first sensor for providing a rotational speed of said primary drive assembly, at least one second sensor for providing a rotational speed of said secondary drive assembly, and a microcontroller for comparing said rotational speed of said primary drive assembly with said rotational speed of said secondary drive assembly and repeatedly incrementing an output to engage said modulating clutch while a difference between said rotational speeds is greater than a first predetermined value and repeatedly decrementing said output to disengage said modulating clutch when said difference is less than a second predetermined value, said incrementing output defining at least eight steps having a duration of about 30 milliseconds.

2. The adaptive four-wheel vehicle drive system of claim 1 wherein said primary drive assembly is at a rear of the vehicle and said secondary drive assembly is at a front of the vehicle.

3. The adaptive four-wheel vehicle drive system of claim 1 wherein said primary drive assembly is at a front of the vehicle and said secondary drive assembly is at a rear of the vehicle.

4. The adaptive four-wheel vehicle drive system of claim 1 further including a sensor indicating a position of a throttle and wherein said microcontroller is responsive to said throttle position sensor for incrementing said modulating clutch.

5. The adaptive four-wheel vehicle drive system of claim 1 wherein said operator includes cam surfaces and said electromagnetic coil is driven by a pulse width modulated signal.

6. The adaptive four-wheel vehicle drive system of claim 1 further including axle engaging clutches for selectively coupling said secondary drive wheels to said secondary axles, wherein said microcontroller detects wheel slip and activates said modulating clutch and said axle engaging crutches when said difference between said rotational speeds exceeds a second predetermined value during two-wheel drive operation.

7. The adaptive four-wheel vehicle drive system of claim 1 further including means for sensing a rotational speed of one of said secondary wheels.

8. The adaptive four-wheel vehicle drive system of claim 1 wherein said predetermined value is dependent upon whether said primary drive assembly or said secondary drive assembly is rotating faster.

9. The adaptive four-wheel vehicle drive system of claim 1 wherein said steps of said incremental output are equal in magnitude.

10. The adaptive four-wheel vehicle drive system of claim 1 wherein said steps of said output are equal in duration.

11. An adaptive four-wheel vehicle drive system comprising, in combination, a primary drive assembly including a primary differential, primary axles and primary drive wheels, a secondary drive assembly including a secondary differential, secondary axles and secondary drive wheels, a transfer case for providing torque to said primary drive assembly, an electric modulating clutch for selectively transferring torque from said primary drive assembly to said secondary drive assembly, said electric modulating clutch including a friction disc pack assembly, an electromagnetic coil, and an operator including at least one cam surface operable to compress said disc pack assembly, primary speed sensors for providing rotational speeds of said primary drive wheels, secondary speed sensors for providing rotational speeds of said secondary drive wheels, and a microcontroller for comparing said rotational speeds of said primary drive wheels with said rotational speeds of said secondary drive wheels and incrementing an output to engage said modulating clutch while a difference between said rotational speeds is greater than a predetermined value and decrementing said output to disengage said modulating clutch when said difference is less than a predetermined value, said incrementing output defining at least eight steps.

12. The adaptive four-wheel vehicle drive system of claim 11 wherein said primary drive assembly is at a rear of the vehicle and said secondary drive assembly is at a front of the vehicle.

13. The adaptive four-wheel vehicle drive system of claim 11 wherein said primary drive assembly is at a front of the vehicle and said secondary drive assembly is at a rear of the vehicle.

14. The adaptive four-wheel vehicle drive system of claim 11 further including a sensor indicating a position of a throttle and wherein said microcontroller is responsive to said throttle position sensor for incrementing said modulating clutch.

15. The adaptive four-wheel vehicle drive system of claim 11 wherein said electric modulating clutch includes an electromagnetic coil and an operator includes cam surfaces and said electromagnetic coil is driven by a pulse width modulated signal.

16. The adaptive four-wheel vehicle drive system of claim 11 further including axle engaging clutches for selectively coupling said secondary drive wheels to said secondary axles, wherein said microcontroller detects wheel slip and activates said modulating clutch and said axle engaging clutches when said difference between said rotational speeds exceeds a second predetermined value during two-wheel drive operation.

17. The adaptive four-wheel vehicle drive system of claim 11 wherein said predetermined value is dependent upon whether said primary drive assembly or said secondary drive assembly is rotating faster.

18. The adaptive four-wheel vehicle drive system of claim 11 wherein said steps of said incremental output are equal in magnitude.

19. The adaptive four-wheel vehicle drive system of claim 11 wherein said steps of said incremental output are equal in duration.

20. An adaptive four-wheel vehicle drive system comprising, in combination, a primary drive assembly including a primary differential, primary axles and primary drive wheels, a secondary drive assembly including a secondary differential, secondary axles and secondary drive wheels, a transfer case for providing torque to said primary drive assembly, an electric clutch for selectively transferring torque from said primary drive assembly to said secondary drive assembly, said electric clutch including a friction disc pack assembly, an electromagnetic coil, and an operator including at least one cam surface operable to compress said disc pack assembly, at least one primary speed sensor for providing a rotational speed of said primary drive wheels, at least one secondary speed sensor for providing a rotational speed of said secondary drive wheels, and a microcontroller for comparing said rotational speeds of said primary drive wheels with said rotational speeds of said secondary drive wheels and incrementing an output to engage said modulating clutch while a difference between said rotational speeds is greater than a predetermined value and decrementing said output to disengage said modulating clutch when said difference is less than a predetermined value, said incrementing output defining at least eight steps.

21. The adaptive four-wheel vehicle drive system of claim 20 wherein said primary drive assembly is at a rear of the vehicle and said secondary drive assembly is at a front of the vehicle.

22. The adaptive four-wheel vehicle drive system of claim 20 wherein said primary drive assembly is at a front of the vehicle and said secondary drive assembly is at a rear of the vehicle.

23. The adaptive four-wheel vehicle drive system of claim 20 further including a sensor indicating a position of a throttle and wherein said microcontroller is responsive to said throttle position sensor for incrementing said modulating clutch.

24. The adaptive four-wheel vehicle drive system of claim 20 wherein said electric clutch operator includes cam surfaces and said electromagnetic coil is driven by a pulse width modulated signal.

* * * * *